US011064463B2

(12) United States Patent
Foster et al.

(10) Patent No.: US 11,064,463 B2
(45) Date of Patent: Jul. 13, 2021

(54) SYSTEMS AND METHODS FOR REUSE OF SPECTRUM RESOURCES

(71) Applicant: THE BOEING COMPANY, Chicago, IL (US)

(72) Inventors: Christopher Jason Foster, Long Beach, CA (US); Robert Alan Hawkins, Jr., Hermosa Beach, CA (US); Paul David Rosenberger, Culver City, CA (US); Jereme Barnett-Woods, El Segundo, CA (US); Peterson L. Browning, Playa Del Rey, CA (US)

(73) Assignee: THE BOEING COMPANY, Chicago, IL (US)

( * ) Notice: Subject to any disclaimer, the term of this patent is extended or adjusted under 35 U.S.C. 154(b) by 163 days.

(21) Appl. No.: 16/151,245

(22) Filed: Oct. 3, 2018

(65) Prior Publication Data
US 2020/0112942 A1 Apr. 9, 2020

(51) Int. Cl.
H04W 72/04 (2009.01)
H04W 16/02 (2009.01)

(52) U.S. Cl.
CPC ........... *H04W 72/04* (2013.01); *H04W 16/02* (2013.01)

(58) Field of Classification Search
CPC ..... H04W 16/02; H04W 16/14; H04W 16/04; H04W 16/10; H04W 16/24; H04W 16/32;
(Continued)

(56) References Cited

U.S. PATENT DOCUMENTS 6,496,490 B1 * 12/2002 Andrews ............... H04W 16/10
370/329
7,088,671 B1 * 8/2006 Monsen ............... H04B 1/7107
370/203

(Continued)

FOREIGN PATENT DOCUMENTS

WO 2015109843 A1 7/2015

OTHER PUBLICATIONS

Extended European Search Report dated Dec. 4, 2019 issued in corresponding Application No. EP19201276.3, 8 pgs.

*Primary Examiner* — Un C Cho
*Assistant Examiner* — Rasha K Fayed
(74) *Attorney, Agent, or Firm* — Moore Intellectual Property Law, PLLC

(57) ABSTRACT

A method includes obtaining a plurality of conflict lists including a conflict list for each communication device. The method also includes obtaining resource requirement values. A resource requirement value indicates a number of orthogonal channels that are required to satisfy demand associated with a communication device. The method includes determining that two or more communication devices are associated with a particular resource requirement value. The method also includes selecting a particular communication device by using the conflict lists to perform a maximum independent set analysis based on the two or more communication devices. The method further includes assigning a set of orthogonal channels to the particular communication device. The set of orthogonal channels include a number of orthogonal channels that is based on the particular resource requirement value. The method also includes configuring a communication system to communicate with the particular communication device based on the set of orthogonal channels.

20 Claims, 8 Drawing Sheets

(58) Field of Classification Search
CPC ..... H04W 16/26; H04W 72/04; H04W 72/00;
H04W 72/082; H04W 72/1226; H04W
72/0413; H04W 72/0453; H04W 72/042;
H04W 72/08; H04W 72/1247; H04W
72/085; H04W 72/0446; H04W 72/048;
H04W 72/1215; H04W 72/046; H04W
28/048; H04W 28/14; H04W 28/16;
H04W 28/065; H04W 28/02; H04W
84/045; H04W 84/047; H04W 84/18;
H04W 84/042; H04W 88/08; H04W
88/02; H04W 52/143; H04W 52/241;
H04W 52/262; H04W 52/244; H04W
52/243; H04W 52/14; H04W 4/00; H04W
74/00; H04W 40/00; H04L 1/0003; H04L
1/0009; H04L 1/0026; H04L 1/1819;
H04L 1/0016; H04L 1/1861; H04L
5/0044; H04L 5/0073; H04L 5/0007;
H04L 5/0094; H04L 5/0062; H04L
5/0066; H04L 5/0023; H04L 5/0035;
H04L 5/0021; H04L 27/0008; H04L
27/0012; H04L 27/01; H04L 27/148;
H04L 27/2602; H04L 27/2636; H04L
27/2646; H04L 27/2647; H04L 27/265;
H04L 27/2601; H04L 27/2614; H04L
47/10; H04B 7/2606; H04B 7/04; H04B
7/212; H04B 7/024; H04B 7/0452; H04B
7/026; H04B 7/0456; H04B 7/0697
See application file for complete search history.

(56) References Cited

U.S. PATENT DOCUMENTS

| | | | |
|---|---|---|---|
| 8,971,904 B2* | 3/2015 | Chou | H04W 72/082 |
| | | | 455/450 |
| 10,374,693 B2 | 8/2019 | Foster | |
| 2011/0310758 A1* | 12/2011 | Tamaki | H04W 74/0808 |
| | | | 370/252 |
| 2012/0166022 A1* | 6/2012 | Kwon | G05D 1/0044 |
| | | | 701/2 |
| 2012/0294168 A1* | 11/2012 | Freda | H04W 24/10 |
| | | | 370/252 |
| 2014/0128088 A1* | 5/2014 | Farhadi | H04W 16/14 |
| | | | 455/452.1 |
| 2015/0078161 A1* | 3/2015 | Elsherif | H04W 16/04 |
| | | | 370/235 |
| 2017/0238267 A1* | 8/2017 | Zhuang | H04W 52/343 |
| | | | 370/328 |

* cited by examiner

SYSTEMS AND METHODS FOR REUSE OF SPECTRUM RESOURCES

FIELD OF THE DISCLOSURE

The present disclosure is generally related to systems and methods for reusing spectrum resources.

BACKGROUND

Generally speaking, communication systems, whether ground-based or satellite-based or airborne, have access to finite communication resources. For example, a satellite-based communication system can divide a spectrum into a finite number of orthogonal channels using a time domain multiplexing, a frequency domain multiplexing, or other multiplexing arrangements. The number of orthogonal channels that the communication system can support presents a limit to total throughput of information through the communication system. Some communication systems are able to use directional communications, e.g., spot beams, to increase the total throughput by reusing spectrum resources. For example, a particular channel can be assigned to more than one device in such a manner that interference between the multiple devices is reduced sufficiently to enable effective communications. To illustrate, where the communication system provides coverage over a large geographic area, devices at different ends of the geographic area can be assigned to the same channel so long as the devices are far enough apart that the communication system is able to differentiate signals from the two devices based on their position. Determining an optimum allocation of spectrum resources among a set of devices to be supported is a challenging problem. For example, an exhaustive search for the optimum allocation may be prohibitively expensive in terms of computing resources as well as introducing significant delay in allocation of the spectrum resources.

SUMMARY

In a particular implementation, a method of reusing spectrum resources of a communication system among multiple communication devices is disclosed. The method includes obtaining a plurality of conflict lists including a conflict list for each communication device of the multiple communication devices. The conflict list for each communication device identifies conflicting communication devices of the multiple communication devices. Each conflicting communication device is associated with an interference metric value that satisfies a threshold. The method also includes obtaining resource requirement values, including a resource requirement value for each communication device of the multiple communication devices. The resource requirement value for each communication device indicates a number of orthogonal channels that are required to satisfy demand associated with the communication device. The method further includes determining that two or more communication devices are associated with a particular resource requirement value. The method also includes selecting a particular communication device from among the two or more communication devices by using the conflict lists to perform a maximum independent set analysis based on the two or more communication devices. The method further includes assigning a set of orthogonal channels to the particular communication device. The set of orthogonal channels include a number of orthogonal channels that is based on the particular resource requirement value. The method also includes configuring the communication system to communicate with the particular communication device based on the set of orthogonal channels.

In another particular implementation, a communication node includes one or more transmitters, one or more receivers, or a combination thereof, configured to enable spectrum resource reuse among a plurality of communications devices. The communication node also includes a communication controller coupled to the one or more transmitters, the one or more receivers, or the combination thereof. The communication controller is configured to reuse spectrum resources by performing operations including obtaining a plurality of conflict lists including a conflict list for each communication device of the plurality of communication devices. The conflict list for each communication device identifies conflicting communication devices of the plurality of communication devices. Each conflicting communication device is associated with an interference metric value that satisfies a threshold. The operations also include obtaining resource requirement values, including a resource requirement value for each communication device of the plurality of communication devices. The resource requirement value for each communication device indicates a number of orthogonal channels that are required to satisfy demand associated with the communication device. The operations further include determining that two or more communication devices are associated with a particular resource requirement value. The operations also include selecting a particular communication device from among the two or more communication devices by using the conflict lists to perform a maximum independent set analysis based on the two or more communication devices. The operations further include assigning a set of orthogonal channels to the particular communication device. The set of orthogonal channels include a number of orthogonal channels that is based on the particular resource requirement value. The operations also include storing configuration settings to configure the one or more transmitters, the one or more receivers, or the combination thereof, to communicate with the particular communication device based on the set of orthogonal channels.

In another particular implementation, a computer-readable storage device stores instructions that are executable by a processor to cause the processor to perform spectrum resource reuse operations including obtaining a plurality of conflict lists including a conflict list for each communication device of a communication system. The conflict list for each communication device identifies conflicting communication devices of the communication system. Each conflicting communication device is associated with an interference metric value that satisfies a threshold. The operations also include obtaining resource requirement values, including a resource requirement value for each communication device of the communication system. The resource requirement value for each communication device indicates a number of orthogonal channels that are required to satisfy demand associated with the communication device. The operations further include determining that two or more communication devices are associated with a particular resource requirement value. The operations also include selecting a particular communication device from among the two or more communication devices by using the conflict lists to perform a maximum independent set analysis based on the two or more communication devices. The operations further include assigning a set of orthogonal channels to the particular communication device. The set of orthogonal channels include a number of orthogonal channels that is based on the particular resource requirement value. The operations also include configuring the communication system to communicate with the particular communication device based on the set of orthogonal channels.

The features, functions, and advantages described herein can be achieved independently in various implementations or may be combined in yet other implementations, further details of which can be found with reference to the following description and drawings.

DETAILED DESCRIPTION

Implementations disclosed herein include efficient reuse packing mechanisms that provide efficient spectrum resource reuse in a manner that guarantees that pairwise interference between devices supported by a communication system satisfies particular interference constraints. Additionally, in some implementations, contiguous sets of orthogonal channels are assigned in a manner that reduces hardware complexity required to support the spectrum reuse. Implementations described herein also allocate spectrum resources to user devices that have a largest resource requirement in order to serve the most users effectively.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Figure 1:
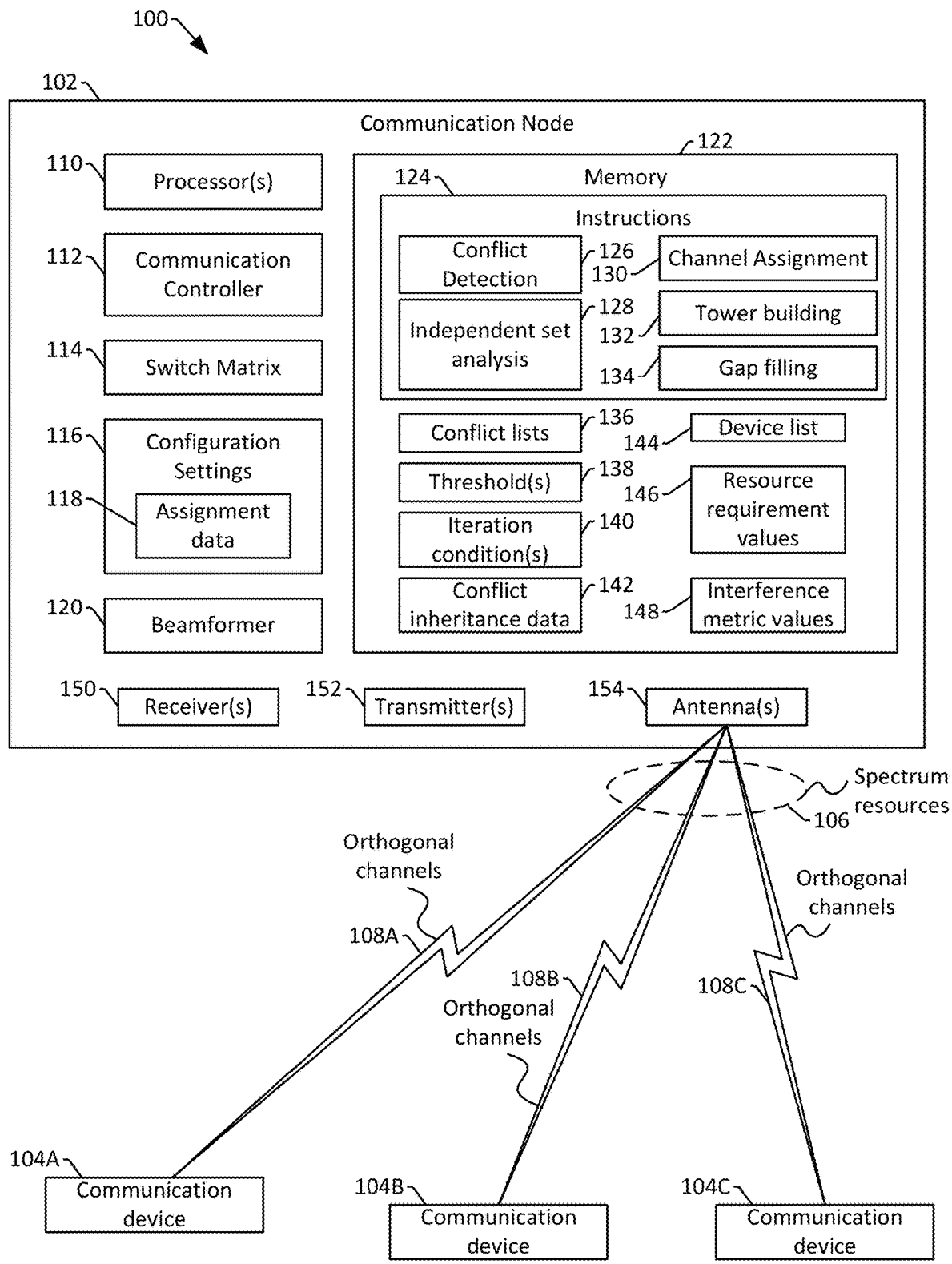
FIG. 1 is a diagram that illustrates a system configured to perform assignment of channels to a communication device to reuse spectrum resources.

Referring to FIG. 1, a communication system 100 is depicted that includes a communication node 102 that supports communications from and between multiple communication devices 104, including a first communication device 104A, a second communication device 104B, and a third communication device 104C.

The communication node 102 can include a satellite-based communication node, a terrestrial communication device, or an airborne communication device, such as a relay device, that facilitates communications between the communication devices 104. The communication devices 104 can include end user devices, such as satellite phones, mobile phones, portable computing devices, etc. The communication devices 104 can include access points that aggregate communications from other devices. For example, the communication devices 104 can include an access point that relays communications from a mobile device through a satellite-based system, an airborne system, or a terrestrial relay system to another communication device 104. In a particular aspect, the communication node 102 (or at least one component of the communication node 102) is integrated in a spacecraft, an aircraft, a land craft, or a watercraft. In a particular aspect, the communication node 102 (or at least one component of the communication node 102) is integrated into a base station. Other examples are also possible. In particular, the communication node 102 is configured to reuse a set of spectrum resources 106 among the communication devices 104 by allocating one or more orthogonal channels 108 to each communication device 104. For example, the communication node 102 is configured to allocate one or more first orthogonal channels 108A to the first communication device 104A, one or more second orthogonal channels 108B to the second communication device 104B, one or more third orthogonal channels 108C to the third communication device 104C, or a combination thereof.

The orthogonal channels 108 are allocated in a manner that enables reuse of the orthogonal channels 108 among the communication devices 104 up to some defined limit and in a manner that reduces interference between the communication devices 104 in order to serve as many end users, e.g., the communication devices 104 or devices supported by the communication devices 104, as possible. For example, the communication node 102 allocates a first set of orthogonal channels 108 as the first orthogonal channels 108A to the first communication device 104A. The communication node 102 also allocates at least a subset of the first set of orthogonal channels 108 to one or more additional communication devices 104, as described herein. A count of the communication devices 104 that are allocated the same subset of the first set of orthogonal channels 108 is less than or equal to the defined reuse limit. A particular orthogonal channel 108 is thus allocated a number of communication devices 104 that is less than or equal to the defined reuse limit. In a particular example, the communication node 102 determines that the second communication device 104B conflicts with the first communication device 104A. The communication node 102 refrains from reusing the same subset of the orthogonal channels 108 for the first communication device 104A and the second communication device 104B. For example, the second orthogonal channels 108B allocated to the second communication device 104B are distinct from the first orthogonal channels 108A allocated to the first communication device 104A. The communication node 102 thus reduces interference by allocating distinct orthogonal channels 108 to conflicting communication devices 104. The communication node 102 allocates the orthogonal channels 108 to as many end users as possible by allocating, at each iteration, orthogonal channels 108 to a communication device 104 that has a highest resource requirement and has the fewest conflicts with other communication devices 104, as described herein. In a particular aspect, the orthogonal channels 108 include time-division multiple access (TDMA) channels, frequency-division multiple access (FDMA) channels, or code-division multiple access (CDMA) channels.

The communication node 102 includes one or more processors 110 and memory 122. The communication node 102 can also include a communication controller 112, a switch matrix 114, and a beamformer 120. In order to facilitate communications with the communication devices 104, the communication node 102 includes one or more receivers 150, one or more transmitters 152, and one or more antennas 154. The receivers 150, the transmitters 152, and the antennas 154 are capable of supporting the orthogonal channels 108. The orthogonal channels 108 can be divided logically based on frequency division multiplexing, time division multiplexing, code division multiplexing, as well as spatially based on spot beams formed by the beamformer 120. In some implementations, operations of the communication controller 112 are performed by one or more of the processors 110. Likewise, in some implementations, operations of the switch matrix 114 are performed by one or more of the processors 110. The switch matrix 114 is configured to map the communication devices 104 to addresses or ports such that communications received at the communication node 102 and addressed to a particular address are routed by the switch matrix 114 to a corresponding spot beam and orthogonal channel in order to reach the proper communication device 104 addressed.

The memory 122 stores instructions 124 that are executable by the processors 110 in order to facilitate allocation of the orthogonal channels 108 to the communication devices 104, as described herein. The instructions 124 include conflict detection instructions 126, independent set analysis instructions 128, channel assignment instructions 130, tower building instructions 132, and gap filling instructions 134. The memory 122 can also store data associated with allocation of the orthogonal channels 108, such as one or more conflict lists 136, thresholds 138 associated with the allocation of the orthogonal channels 108, iteration conditions 140 associated with the allocation of the orthogonal channels 108, conflict inheritance data 142 associated with the allocation of the orthogonal channels 108, a device list 144 identifying the communication devices 104 and associated with the allocation of the orthogonal channels 108, resource requirement values 146 associated with the communication devices 104, interference metric values 148 associated with the communication devices 104, or a combination thereof. In some implementations, the memory 122 stores other data as well, such as configuration settings 116, beamforming parameters for the beamformer 120, etc.

The configuration settings 116 can include assignment data 118 identifying which particular orthogonal channels 108 are assigned or allocated to each communication device 104. For example, the assignment data 118 may be used to configure the switch matrix 114, the beamformer 120, or both, in order to facilitate communications with the respective communication devices 104 after allocation of the orthogonal channels 108 to the communication devices 104.

In a particular implementation, the conflict detection instructions 126 are executable by the processors 110 to obtain the interference metric values 148 and to generate the conflict lists 136. In some implementations, the conflict lists 136 can be generated by a device separate from the communication node 102. For example, in the case where the communication node 102 is a satellite-based system, the conflict lists 136 can be generated by a ground-based control system. The interference metric values 148 provide an indication of interference between pairs of the communication devices 104. For example, the interference metric values 148 may include a value indicating a quantified interference between the first communication device 104A and the second communication device 104B. Likewise, the interference metric values 148 can include a value indicating possible interference between the first communication device 104A and the third communication device 104C. In a particular implementation, the interference metric values 148 include pairwise interference metrics for each communication device 104 supported by the communication node 102.

The thresholds 138 include an interference threshold that indicates an allowable level of interference between communication devices 104. For example, where the interference metric is a signal-to-noise ratio of a transmission of the first communication device 104A as detected at the second communication device 104B, the thresholds 138 can include a maximum signal-to-noise ratio that is acceptable. Since the communication devices 104 can transmit at different power levels, as well as for other reasons, the interference metric values 148 can include interference values from the first communication device 104A as detected at the second communication device 104B, as well as a separate interference metric value for a transmission from the second communication device 104B as detected at the first communication device 104A.

The conflict lists 136 indicate or identify conflicting communication devices among the communication devices 104 supported by the communication node 102. Each conflicting communication device is associated with an interference metric value that satisfies one of the interference metric thresholds of the thresholds 138. For example, where the interference metric threshold indicates a maximum signal-to-noise ratio, if a transmission of the first communication device 104A exceeds the signal-to-noise ratio received at the second communication device 104B, the conflict lists 136 indicate that the first communication device 104A is a conflicting communication device for the second communication device 104B. However, based on a distance to the third communication device 104C, the first communication device 104A may not be a conflicting communication device with the third communication device 104C. Likewise, due to transmission strength or other factors, a transmission from the second communication device 104B may or may not exceed the interference threshold as received at the first communication device 104A. Thus, the second communication device 104B may or may not be a conflicting communication device in the conflict lists 136 for the first communication device 104A. Stated another way, the conflict lists 136 include for each of the communication devices 104, a list or other indication of which other communication devices 104 have an interference metric value that satisfies the interference metric value threshold. In some implementations, the conflict lists 136 may not be symmetrical. That is to say if the second communication device 104B is a conflicting communication device for the first communication device 104A, this is not an indication that the first communication device 104A is a conflicting communication device for the second communication device 104B.

In a particular implementation, the conflict lists 136 can be generated or stored in a data structure as an adjacency matrix, such as a N by N matrix in which N is a positive integer equal to the number of communication devices 104 served by the communication node 102. Thus, the adjacency matrix includes one column and one row for each of the communication devices 104. In a particular example, the adjacency matrix is a Boolean matrix with a first logical value indicating that a particular communication device is a conflicting communication device and a second logical value indicating that the particular communication device is not a conflicting communication device. For example, where a particular row represents the first communication device 104A, the particular row may include a cell corresponding to a column of the second communication device 104B. The cell may have a value of 0 indicating that the second communication device 104B is not a conflicting communication device for the first communication device 104A. Alternatively, the cell can have a value of 1 indicating that the second communication device 104B is a conflicting communication device for the first communication device 104A. Other data structures may also be used to represent the conflict lists 136.

The resource requirement values 146 indicate resources required by each of the communication devices 104. For example, each communication device 104 is associated with a particular demand, which can include some indication of data bandwidth, that the communication device 104 requires in order to support its own communication needs or the needs of users associated with the communication device 104. In order to satisfy a particular demand, a certain number of orthogonal channels 108 are required based on communication efficiency associated with each communication device 104 as well as throughput associated with each orthogonal channel 108. Thus, the resource requirement values 146 indicate, for each communication device 104, a number of orthogonal channels 108 required to support demand at the respective communication device 104.

The tower building instructions 132 are executable by the processors 110 to use the independent set analysis instructions 128, the conflict lists 136, and the resource requirement values 146 in order to facilitate assigning particular orthogonal channels 108 to the communication devices 104. In particular, as described herein, the tower building instructions 132 can iteratively or repeatedly call the independent set analysis instructions 128 to allocate the orthogonal channels 108 to the communication devices 104 on a worst first basis. In this context, worst first refers to allocating orthogonal channels 108 to communication devices 104 based upon which communication devices 104 have the largest resource requirement values 146 by using the worst first allocation in conjunction with the independent set analysis instructions 128. The independent set analysis instructions 128 perform an independent set analysis (e.g., a maximum independent set analysis) on a set of communication devices 104 that each has the largest resource requirement value 146. In a particular example, the independent set analysis instructions 128 determine that each of the second communication device 104B and the third communication device 104C has the largest resource requirement value 146. The independent set analysis instructions 128 performs independent set analysis to identify, based on the conflict lists 136, that the second communication device 104B does not conflict with the first communication device 104A. In a particular implementation, the independent set analysis instructions 128 performs a maximum independent set analysis to identify, based on the conflict lists 136, a particular communication device 104 that has the fewest conflicts among the set of communication devices 104. For example, the independent set analysis instructions 128 determine, based on the conflict lists 136, that the second communication device 104B has fewer conflicts than the third communication device 104C. In this example, the tower building instructions 132 allocate a set of orthogonal channels 108 to the second communication device 104B corresponding to the fewest conflicts. The tower building instructions 132 can thus allocate orthogonal channels 108 to communication devices 104 in a manner that serves the largest resource requirement values 146 while satisfying the conflict conditions as indicated by the conflict lists 136.

In a particular aspect, an independent set is a set of vertices in a graph without any adjacent vertices. A maximum independent set is an independent set of largest possible size for a given graph. In a particular implementation, the independent set analysis instructions 128 perform a maximum independent set analysis by selecting a particular communication device 104 having the fewest conflicts among the set of communication devices 104 so that the fewest devices are removed from consideration (due to conflicts) during a next iteration of the tower building instructions 132. Eliminating the fewest devices at each iteration enables the tower building instructions 132 to allocate the orthogonal channels 108 to a largest possible set of non-conflicting communication devices 104. It should be understood that the maximum independent set analysis is described as an illustrative example. In some implementations, the independent set analysis instructions 128 perform an independent set analysis other than a maximum independent set analysis. For example, the independent set analysis instructions 128 select a particular communication device 104 having fewer than a threshold number of conflicts among the set of communication devices 104. In this example, a particular communication device 104 having less than or equal to a tolerable number of conflicts (e.g., 1) can be selected without having to identify the particular communication device 104 having the fewest conflicts. When the set of communication devices 104 (e.g., unallocated and having the largest resource requirement value 146) is large, identifying a particular communication device 104 having less than or equal to a tolerable number of conflicts (e.g., 1) can be faster than identifying the particular communication device 104 having the fewest conflicts. In some implementations, the independent set analysis instructions 128 rank the set of communication devices 104 based on number of conflicts (e.g., ranked from the fewest conflicts to the most conflicts) and select a particular communication device 104 having a particular rank (e.g., nth rank). Specific illustrations of the tower building instructions 132 using the independent set analysis instructions 128, the conflict lists 136, and the resource requirement values 146 are described with reference to FIGS. 2 and 3.

In a particular implementation, the tower building instructions 132 operate in a manner that allocates contiguous sets of the orthogonal channels 108 to particular communication devices 104. In some implementations, the execution of the tower building instructions 132 to allocate the orthogonal channels 108 can result in some orthogonal channels 108 being allocated to fewer than the maximum number of communication devices that can be supported by a number of reuses threshold of the thresholds 138. In these implementations, the gap filling instructions 134 can be executed in order to allocate such sets of the orthogonal channels 108 to the communication devices 104 that have smaller resource requirement values 146 in order to effectively pack the orthogonal channels 108 as illustrated and described further with reference to FIG. 3 and FIGS. 4A and 4B.

As execution of the independent set analysis instructions 128, the tower building instructions 132, and the gap filling instructions 134 assign the orthogonal channels 108 to the communication devices 104, the channel assignment instructions 130 change the configuration settings 116 by updating or storing the assignment data 118. The channel assignment instructions 130 thus configure the communication system 100 to communicate with the communication devices 104 using the allocated set of orthogonal channels 108.

Figure 2:
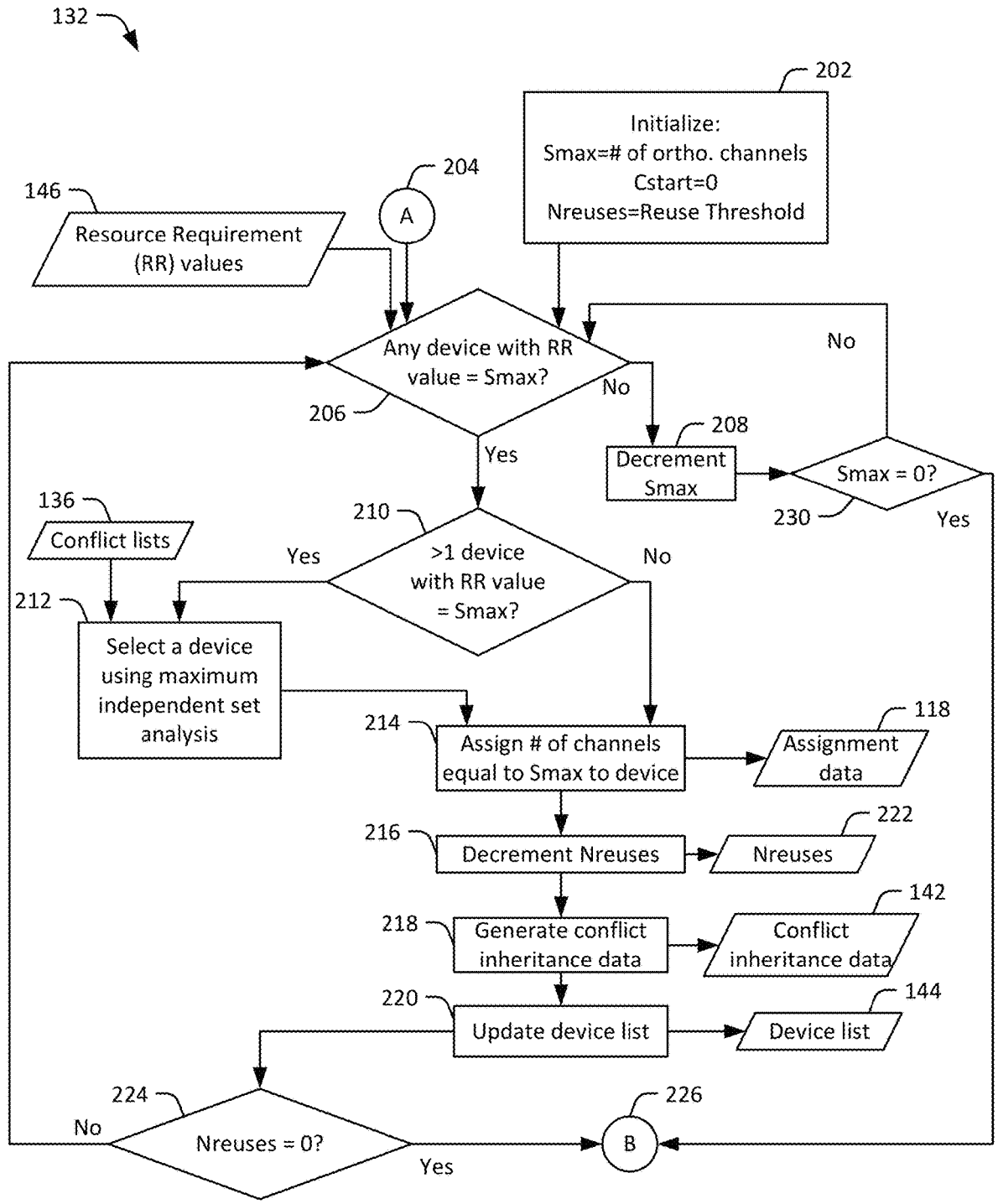
FIG. 2 is a diagram that illustrates a flow chart of an example of a method of tower building that may be performed by the system of FIG. 1.
Figure 3:
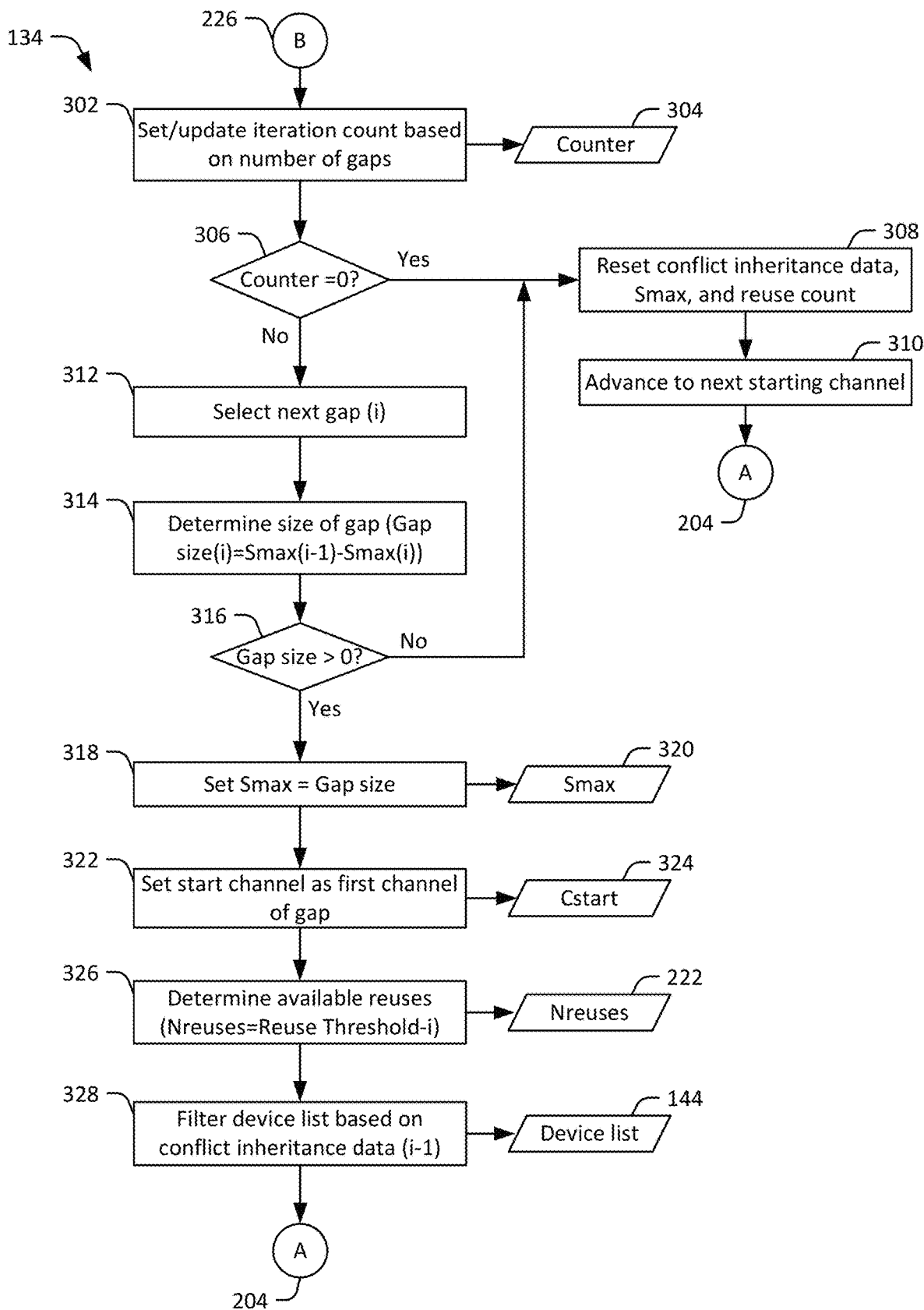
FIG. 3 is a diagram that illustrates a flow chart of an example of a method of gap filling that may be performed by the system of FIG. 1.

During allocation of the orthogonal channels 108, the processors 110 store working data such as the iteration conditions 140, the conflict inheritance data 142, and the device list 144, which can be updated and used to control iteration of the instructions 124 as well as allocation of the orthogonal channels 108, as described in more detail with respect to FIGS. 2 and 3.

Assignment of the orthogonal channels 108 using the independent set analysis instructions 128, the tower building instructions 132, and/or the gap filling instructions 134 can ensure that particular interference metric requirements are satisfied among the communication devices 104, such as pairwise interference metrics, and can satisfy reuse conditions by reusing particular orthogonal channels 108 no more than a specified threshold number of reuses, while spreading assignment of the orthogonal channels 108 in a relatively uniform manner that improves operation of the communication system 100 as a whole. The communication system 100 enables an efficient allocation of the orthogonal channels 108 using independent set analysis (e.g., a maximum independent set analysis). For example, during an iteration of the tower building instructions 132, the independent set analysis instructions 128 select a particular communication device 104 having the fewest conflicts based on the conflict lists 136. In other examples, the independent set analysis instructions 128 can select a particular communication device 104 using different criteria (e.g., fewer than threshold conflicts, second fewest conflicts, etc.). The selection of the particular communication device 104 (e.g., having the fewest conflicts, fewer than threshold conflicts, or second fewest conflicts) based on the conflict lists 136 corresponds to a O(N) heuristic. During each iteration of the tower building instructions 132, communication devices 104 that conflict with the selected particular communication device 104 are removed from consideration. In these examples, the overall maximum independent analysis (performed by the tower building instructions 132 in conjunction with the independent set analysis instructions 128) thus corresponds to a O(N*log(N)) heuristic. The efficient allocation of the orthogonal channels 108 conserves computing resources and reduces delay.

Figure 5:
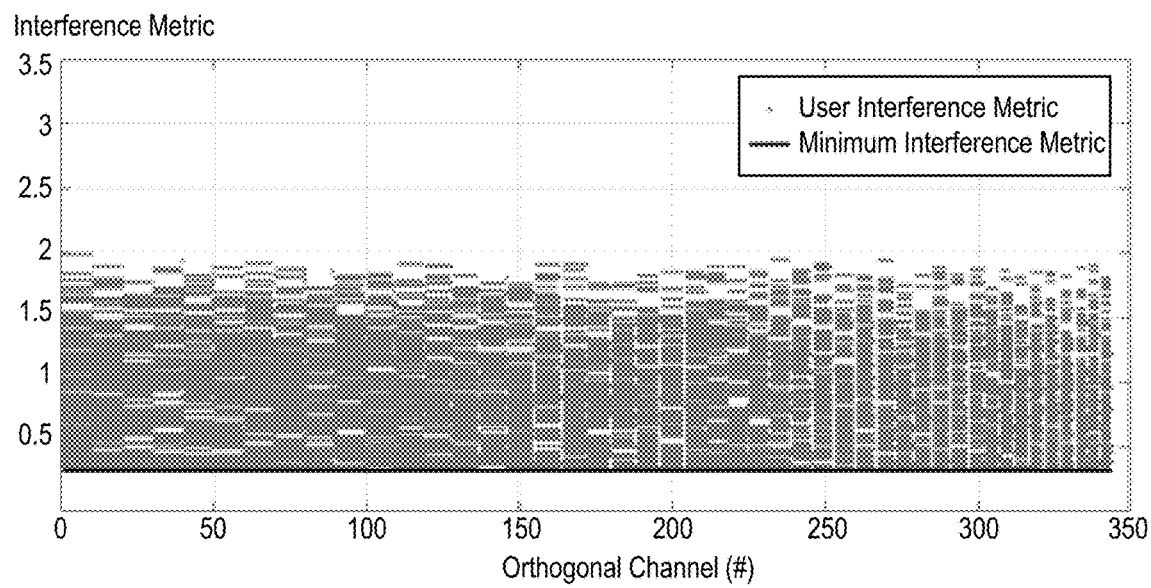
FIG. 5 is a diagram that illustrates an example of an interference metric that may be enforced across a resource spectrum by the system of FIG. 1.
Figure 6:
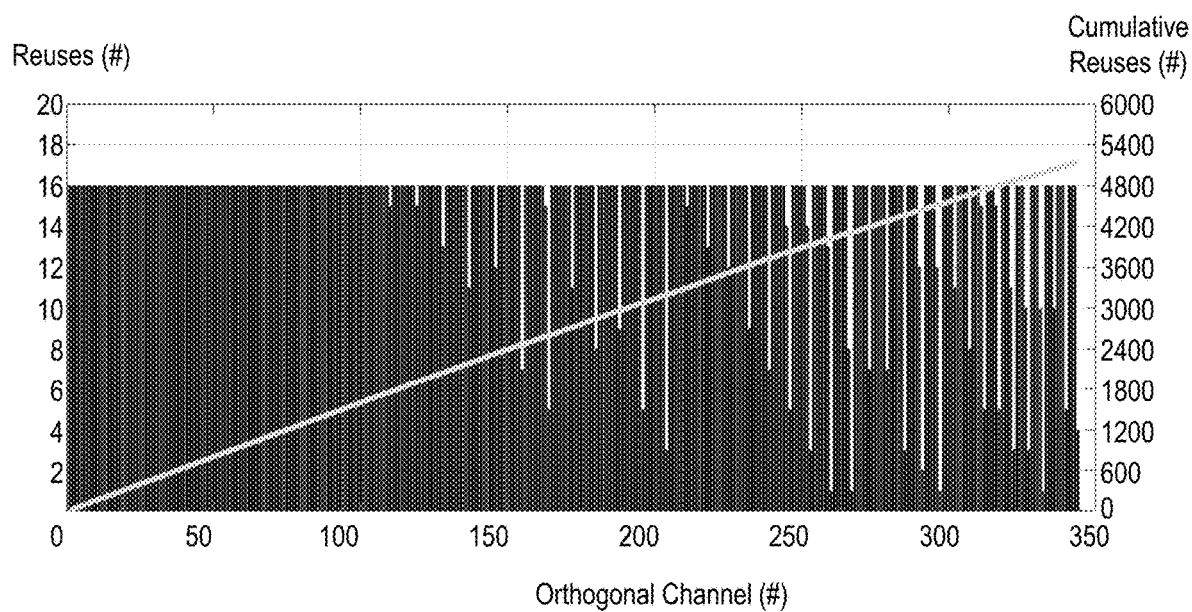
FIG. 6 is a diagram that illustrates an example of orthogonal channel reuse across a resource spectrum that may be performed by the system of FIG. 1.
Figure 7:
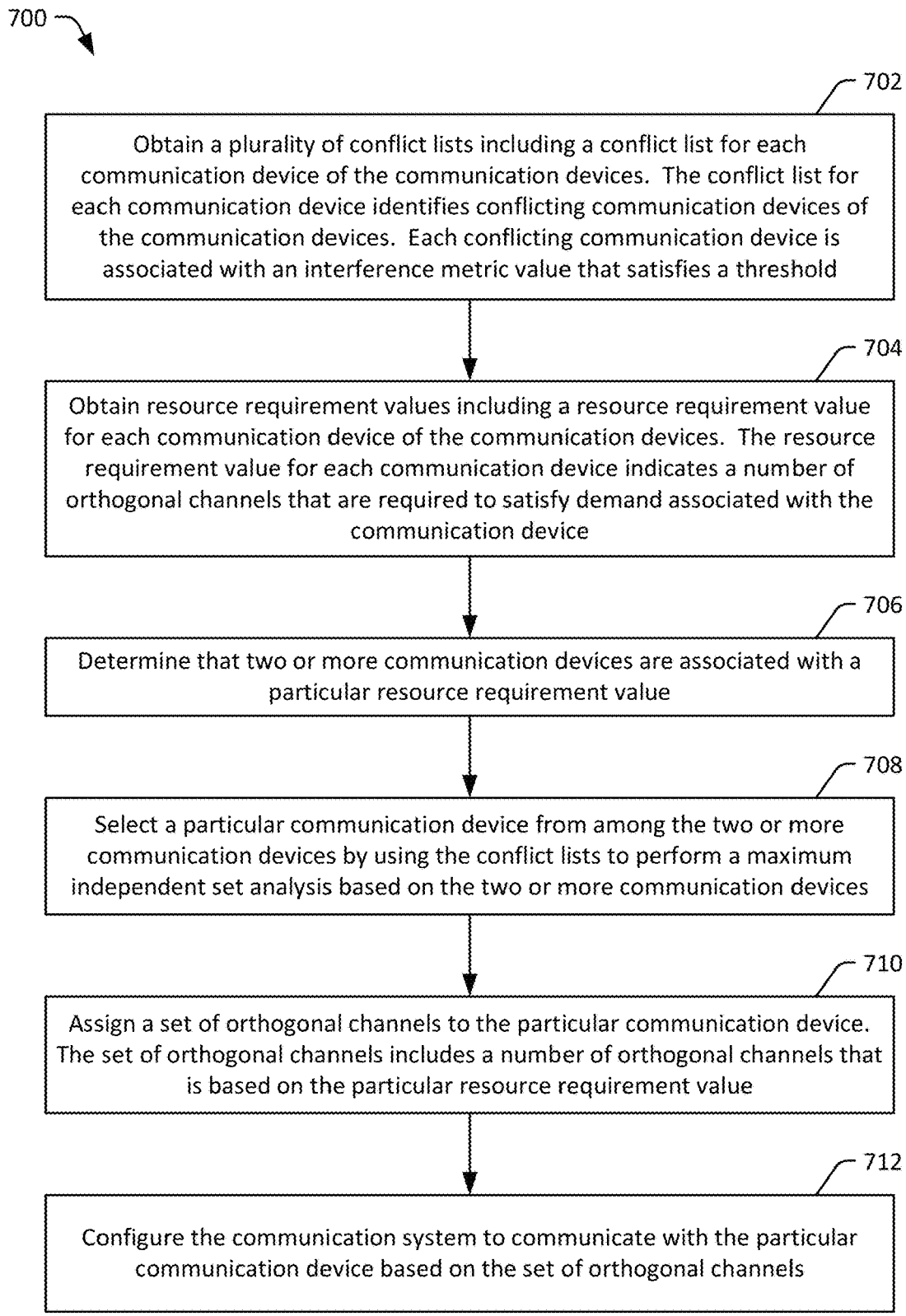
FIG. 7 is a diagram that illustrates a flow chart of an example of a method may be performed by the system of FIG. 1.

Specific operations of the independent set analysis instructions 128, the tower building instructions 132, and the gap filling instructions 134 are described in more detail with reference to FIGS. 2, 3, 4A, and 4B. FIGS. 5 and 6 illustrate performance of the communication node 102 based on the channel allocation mechanisms described herein, and FIG. 7 illustrates a flowchart of a simplified description of the channel allocations described herein.

FIG. 2 is a flowchart illustrating a particular example of operations of the tower building instructions 132. In a particular implementation, the tower building instructions 132 are executed by the processors 110, the communication controller 112, the communication node 102, the system 100 of FIG. 1, or a combination thereof.

In the example illustrated in FIG. 2, the tower building instructions 132 operate iteratively until particular iteration conditions are satisfied, such as until a number of reuses threshold is satisfied or until no communication devices 104 remain without a conflict with previously allocated communication devices 104. During an initial iteration, the tower building instructions 132 include initialization, at block 202. Initializing the tower building instructions 132 includes, for example, setting a working variable S max to a number of the orthogonal channels 108 in the spectrum that are available to be reused, setting a starting channel ("Cstart") to an initial value, e.g., 0, and setting a number of reuses to the number of reuses threshold.

The number of the orthogonal channels 108 that are available to be reused is based on hardware constraints of the communication node 102, software constraints of the communication node 102, the configuration settings 116 of the communication node 102, or a combination thereof. For example, the number of the orthogonal channels 108 available to be reused can indicate a total number of logically divisible channels that the communication node 102 is capable of (or configured to) support and allocate among the communication devices 104.

The number of reuses threshold indicates how many times a particular orthogonal channel can be reused among the communication devices 104. For example, a number of reuses threshold of 2 indicates that a particular orthogonal channel can be allocated twice among the communication devices 104. A more likely example is a number of reuses threshold of 16 or higher indicating that a particular orthogonal channel can be allocated up to 16 times among the communication devices 104. In some implementations, the communication node 102 can be configured to reuse a particular orthogonal channel more than 16 times. In some implementations, the number of reuses threshold can be infinite indicating that there is no limit to a number of times that a particular orthogonal channel can be reused among the communication devices 104 so long as other conditions are satisfied. The number of reuses threshold can be established based on the configuration settings 116, the hardware of the communication node 102, the software of the communication node 102, or a combination thereof. In a particular aspect, the transmitters 152, the receivers 150, or a combination thereof, support a particular number of reuses of particular orthogonal channels. In this aspect, the number of reuses threshold is based at least in part on the number of reuses of each orthogonal channel supported by the transmitters 152, the receivers 150, or a combination thereof.

The starting channel ("Cstart") indicates an identifier of a particular orthogonal channel that is to be the first orthogonal channel assigned to a particular device during a particular iteration of the tower building instructions 132. In the example illustrated in FIG. 2, the starting channel ("Cstart") is identified by a numeric value, where the numeric values assigned to the channels begin at 0 and continue through a total number of the orthogonal channels 108 that can be used by the communication system 100. In this case, the total number being equal to S max, as indicated above.

The tower building instructions 132 access the resource requirement values 146 and compare the resource requirement values 146 to the S max value, where the S max value is initially the total number of the orthogonal channels 108 that can be allocated by the communication node 102 to the communication devices 104 and is decremented in some iterations of the tower building instructions 132. Thus, the S max value counts down from the total number of available orthogonal channels 108 to some minimum number of the orthogonal channels 108 that can be assigned to any particular communication device 104 which in many cases may be 0, although other minimum values can be used in some implementations.

In the example illustrated in FIG. 2, the tower building instructions 132, at block 206, determine whether any communication device 104 has a resource requirement value 146 that is equal to the current value of S max. In the initial iteration, the current value of S max is equal to the total number of the orthogonal channels 108 that are available. During the initial iteration, the tower building instructions 132 determine whether any of the communication devices 104 is associated with a resource requirement value 146 that requires use of all of the available orthogonal channels. If not, the S max value is decremented (e.g., by 1 or by some other decrement value), at block 208, and the tower building instructions 132 determine whether the current value of S max is equal to a S max value threshold, e.g., 0, at block 230. In other implementations, the S max value threshold can be different than 0. A S max value threshold of 0 indicates that the smallest number of orthogonal channels that can be allocated to a particular device is 1. Thus, when the condition is satisfied, the tower building instructions 132 proceed to block 226 which is an off-page reference to the gap filling instructions 134, as illustrated in FIG. 3. However, in some implementations, the S max value threshold is greater than 0 indicating that the minimum number of orthogonal channels that can be allocated to a particular communication device 104 is greater than 1. If, at block 230, the current S max value is not equal to the S max value threshold, the tower building instructions 132 return to block 206 and again determine whether any communication device 104 is associated with the resource requirement value 146 that is equal to the current S max value.

When one or more communication devices 104 are identified as associated with resource requirement values 146 equal to the current value of S max, at block 206, the tower building instructions 132 proceed to block 210 where a determination is made whether more than one communication device 104 is associated with a resource requirement value 146 equal to the current value S max. If only one communication device 104 (e.g., no more than one communication device 104) is associated with the resource requirement value 146 equal to the current value of S max, the tower building instructions 132 assign a number of channels equal to the current value of S max to the communication device 104 by generating (or updating) the assignment data 118, at block 214. For example, the tower building instructions 132 assign the first orthogonal channels 108A to the first communication device 104A in response to determining that a resource requirement value 146 of the first communication device 104A is equal to the current value of S max. The number (e.g., a count) of the first orthogonal channels 108A assigned to the first communication device 104A is equal to the current value of S max.

The orthogonal channels 108 assigned to a communication device 104, at block 214, begin with the channel identified by the Cstart value (e.g., 0 in the initial iteration). Thus, the orthogonal channels assigned to a particular communication device 104 in the initial iteration of the tower building instructions 132 begin at the orthogonal channel 108 associated with the 0 identifier and continue to an orthogonal channel 108 associated with an identifier of S max−1 for a total of S max channels assigned to the particular communication device 104.

At block 210, if more than one communication device 104 is associated with a resource requirement value 146 equal to the current value of S max, the tower building instructions 132 call the independent set analysis instructions 128 to select a particular one of the communication devices 104 associated with the resource requirement value 146 equal to the S max value. The independent set analysis instructions 128 obtain the conflict list 136 and select, at block 212, a particular communication device 104 that is least conflicted among the communication devices 104 associated with the resource requirement value 146 equal to the current value of S max. For example, if each of the first communication device 104A and the second communication device 104B is associated with a resource requirement value 146 equal to the current value of S max and the conflict lists 136 indicate that the first communication device 104A conflicts with only two other communication devices 104 whereas the second communication device 104B conflicts with three other communication devices 104, the independent set analysis instructions 128 select the first communication device 104A based on the first communication device 104A conflicting with fewer other communication devices than the second communication device 104B.

Tower building instructions 132 proceed to block 214 to assign a number of orthogonal channels 108 equal to the current value of S max to a communication device 104 selected by the independent set analysis instructions 128. For example, the tower building instructions 132 assign the first orthogonal channels 108A to the first communication device 104A.

The tower building instructions 132 proceed to block 216 to decrement the number of reuses value to generate an updated number of reuses 222 and proceed to block 218 to generate the conflict inheritance data 142 and to block 220 to update the device list 144. During the initial iteration of the tower building instructions 132, the number of reuses is initialized, at block 202, to the number of reuses threshold, thus at block 216 the number of reuses is decremented typically by 1 to indicate that the set of orthogonal channels 108 assigned at block 214 indicates one reuse of those orthogonal channels 108. During subsequent iterations of the tower building instructions 132, the number of reuses is decremented further to indicate a number of reuses of the orthogonal channels 108 in question in order to ensure that the number of reuses does not exceed the number of reuses threshold.

The conflict inheritance data 142 identifies communication devices 104 that conflict, based on the conflict lists 136, with the particular communication device 104 to which the orthogonal channels 108 are assigned at block 214. For example, referring to the previous example of the independent set analysis instructions 128, when the first communication device 104A was described as conflicting with two other communication devices, the tower building instructions 132, at block 218, update the conflict inheritance data 142 to include the two communication devices in response to determining that the independent set analysis instructions 128 selected the first communication device 104A to be assigned the first orthogonal channels 108A.

The device list 144 identifies the communication devices 104 that are available during a particular iteration of the tower building instructions 132 to be allocated orthogonal channels 108. If a communication device 104 conflicts with another communication device 104 to which orthogonal channels 108 have previously been assigned, the communication device 104 is removed from the device list 144. Thus, in the previous example where the first communication device 104A conflicted with two other communication devices 104, the tower building instructions 132, at block 220, remove the two conflicting communication devices 104 from the device list 144. Thus, in a subsequent iteration of the tower building instructions 132 neither of those communication devices 104 will be assigned orthogonal channels 108 that are a subset of the orthogonal channels 108 assigned to the first communication device 104A. For example, the first communication device 104A is assigned the first orthogonal channels 108A in a particular iteration of the tower building instructions 132. In a subsequent iteration of the tower building instructions 132, the tower building instructions 132 can assign (e.g., reuse) a subset of the first orthogonal channels 108A (e.g., the second orthogonal channels 108B) to the second communication device 104B based at least in part on determining that the second communication device 104B is not a conflicting communication device for the first communication device 104A and that the first communication device 104A is not a conflicting communication device for the second communication device 104B. If the tower building instructions 132 determine that the second communication device 104B is a conflicting communication device for the first communication device 104A or that the first communication device 104A is a conflicting communication device for the second communication device 104B, the second communication device 104B is not assigned a subset of the first orthogonal channels 108A.

After generating the assignment data 118, decrementing the number of reuses 222, generating the conflict inheritance data 142, and updating the device list 144, the tower building instructions 132 can determine whether an iteration condition is satisfied. In a particular example illustrated in FIG. 2, the tower building instructions 132 compare the number of reuses 222 to a threshold (e.g., 0), at block 224. If the number of reuses 222 is equal to the threshold (e.g., 0), the tower building instructions 132 proceed to block 226 to the gap filling instructions 134 as illustrated in FIG. 3. However, if the number of reuses 222 is not equal to the threshold (e.g., 0), the tower building instructions 132 proceed to block 206 to determine whether any of the communication devices 104 indicated by the device list 144 have a resource requirement value 146 that is equal to the current value of S max. If not, the tower building instructions 132 decrement the current value of S max at block 208 and determine whether the current value of S max is equal to a threshold (e.g., 0) at block 230. Thus, when the condition is satisfied, the tower building instructions 132 proceed to block 226 to the gap filling instructions, as illustrated in FIG. 3. If, at block 230, the current S max value is not equal to the threshold, the tower building instructions 132 return to block 206 to perform another iteration. Execution of the tower building instructions 132 continues in the example illustrated in FIG. 2, until an iteration condition is satisfied. The iteration condition can include a number of reuses equal to the threshold, e.g., at block 224, or a current value of S max equal to a threshold, e.g., at block 230.

In summary, the tower building instructions 132 start from an initial value of S max equal to the number of available orthogonal channels 108 and assign orthogonal channels 108 to the communication devices 104 based on the resource requirement values 146 in a manner that allocates the orthogonal channels 108 to the communication devices 104 having the largest resource requirement values 146 where possible. Where multiple communication devices 104 have the same resource requirement value 146, the tower building instructions 132 allocate the orthogonal channels 108 by using the independent set analysis instructions 128 in order to select a particular communication device 104 that is least conflicted among the communication devices 104 having the same resource requirement value 146.

Figure 4A:
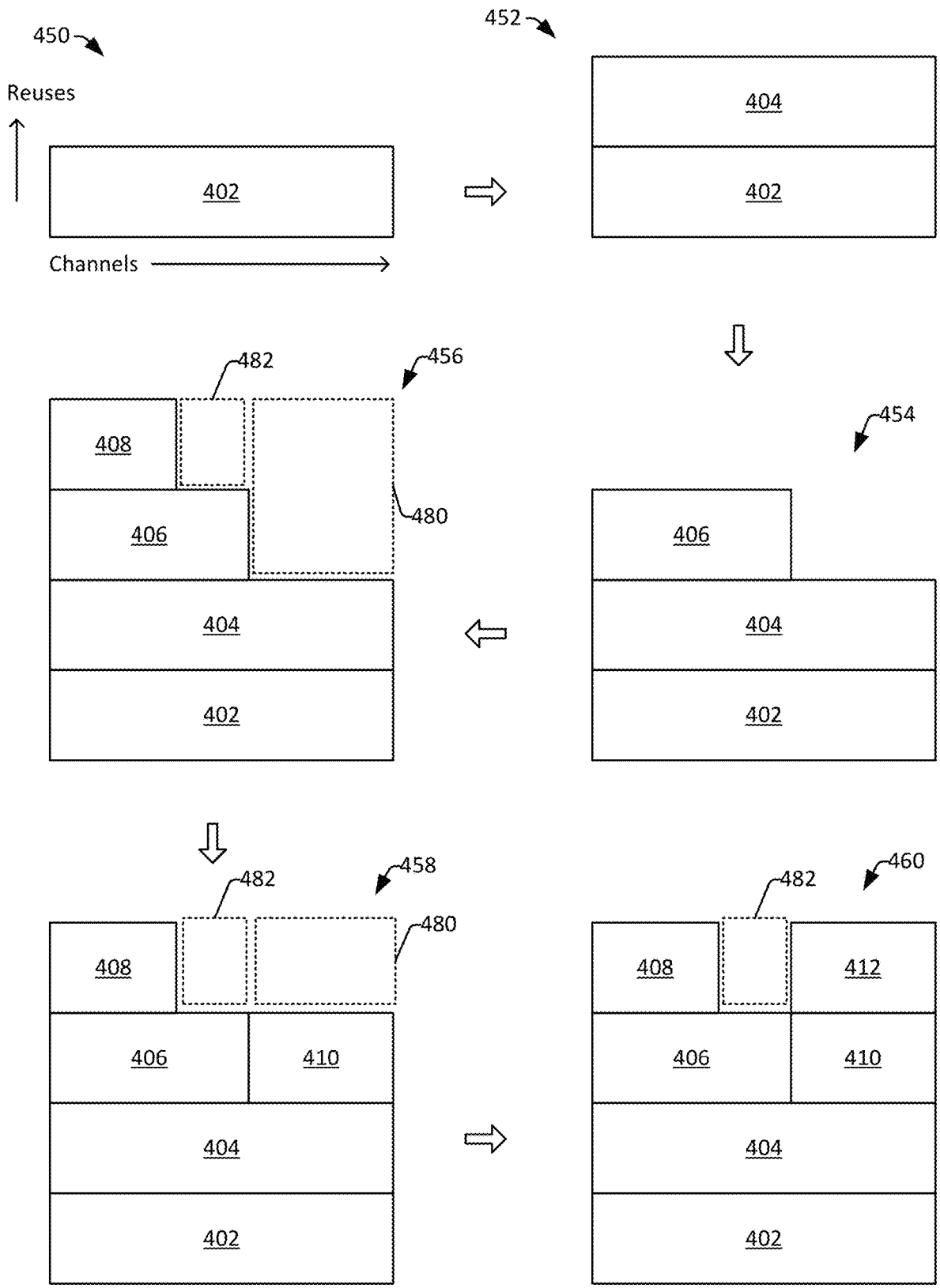
FIG. 4A is a diagram that illustrates an example of a channel assignment that may be performed by the system of FIG. 1.
Figure 4B:
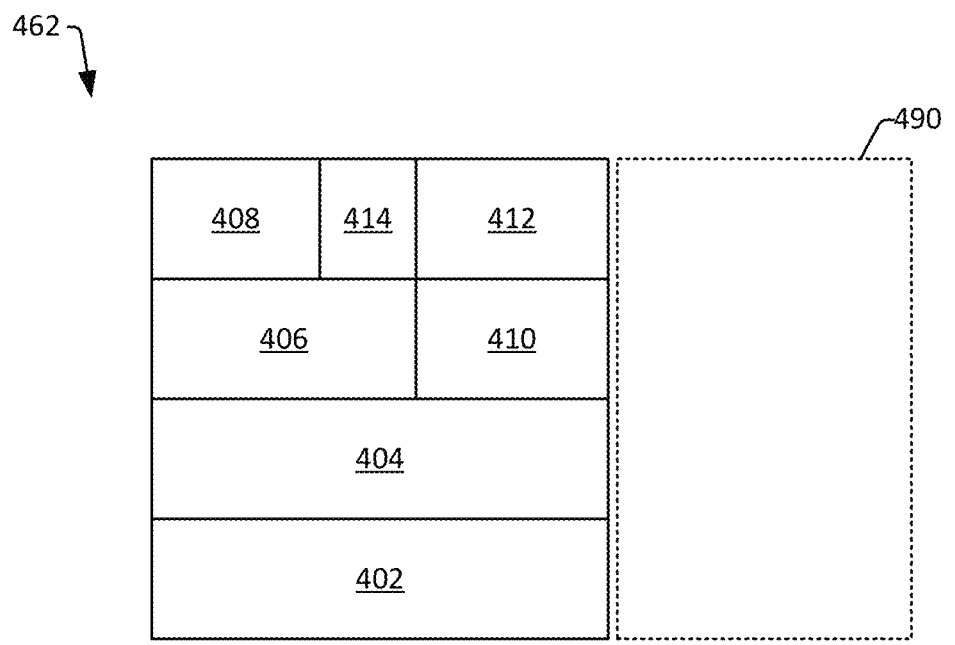
FIG. 4B is a diagram that illustrates an example of a channel assignment that may be performed by the system of FIG. 1.
Figure 4B:
Figure 4B:
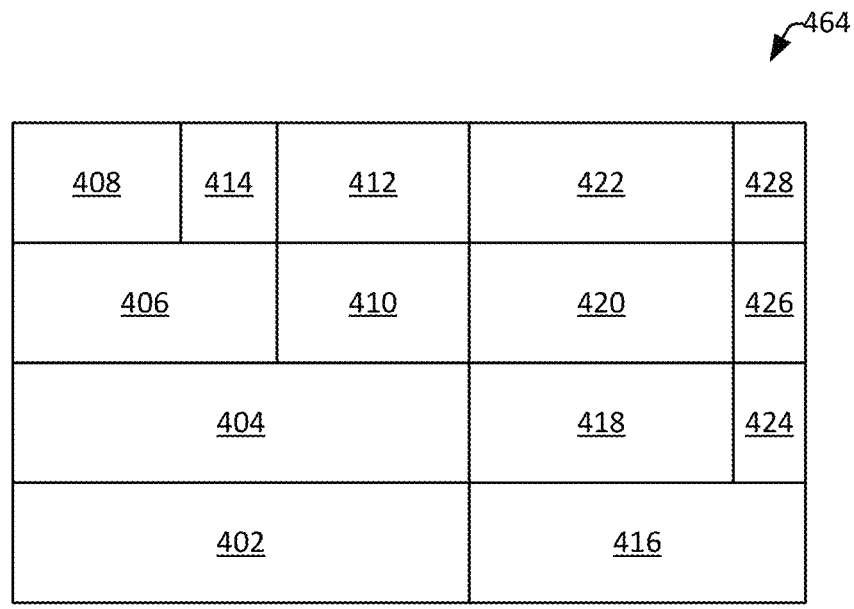

The tower building instructions 132 in this example iterate until the iteration conditions are satisfied, which is illustrated in FIGS. 4A and 4B as analogous to building a tower starting from a foundation corresponding to a largest set of orthogonal channels 108 allocated to a particular communication device 104 and building up to a total number of reuses for the particular set of orthogonal channels 108 in question. During each iteration of the tower building instructions 132, the same set of orthogonal channels 108 or a subset of the set of orthogonal channels 108 is allocated to a particular communication device 104 until particular conditions are satisfied. Thus, during a first iteration a set of orthogonal channels 108 from Cstart=0 to S max−1 is assigned to a first communication device 104 and during the next iteration of the tower building instructions 132 a set of orthogonal channels 108 from Cstart=0 to S max−1 or S max minus an integer value greater than 1 is assigned to the next communication device 104. In this example, the Cstart value can be modified in the gap filling instructions 134 in order to advance to a next set of orthogonal channels 108 to be allocated as described herein.

FIG. 3 is a flowchart illustrating a particular example of operations of the gap filling instructions 134. In a particular implementation, the gap filling instructions 134 are executed by the processors 110, the communication controller 112, the communication node 102, the system 100 of FIG. 1, or a combination thereof.

In the example illustrated in FIG. 3, the gap filling instructions 134 are called by the tower building instructions 132 as indicated by the off-page reference 226 of FIGS. 2 and 3. As described with reference to FIG. 2, the gap filling instructions 134 may be called when an iteration condition associated with the tower building instructions 132 is satisfied. Since the tower building instructions 132 assign a particular set of orthogonal channels 108 to a communication device 104 based on a current value of S max and then subsequently based on smaller values of S max but starting from the same start channel ("Cstart"), the orthogonal channels 108 assigned by the tower building instructions 132 before calling the gap filling instructions 134 can be analogized to building a tower using subsets of orthogonal channels 108 where the base of the tower corresponds to a particular communication device 104 allocated a largest number of orthogonal channels 108 and a top of the tower corresponds to another communication device 104 allocated a subset of the orthogonal channels 108 allocated to the particular communication device 104.

Referring briefly to FIGS. 4A and 4B, operation of the tower building instructions 132 and the gap filling instructions 134 is illustrated in FIGS. 4A and 4B. In FIGS. 4A and 4B, each block represents a communication device 104 assigned a number of orthogonal channels 108. A width of the block corresponds to a number of orthogonal channels 108 allocated to the communication device 104 and a position of the block indicates an identifier of the particular set of orthogonal channels 108. A leftmost block begins at an orthogonal channel 108 (e.g., Cstart=0) allocated during an initial iteration of the flowchart of FIG. 2. Since the tower building instructions 132 allocate a particular set of orthogonal channels 108 and then subsequently allocate subsets of the particular set of orthogonal channels 108, the allocation of the orthogonal channels 108 by the tower building instructions 132 can be analogized to building a tower. Each block of the tower represents a subset of the particular set of orthogonal channels 108 allocated to a particular communication device 104.

When a particular orthogonal channel 108 or a set of orthogonal channels 108 is reused, another communication device 104 assigned the orthogonal channel 108 or the set of orthogonal channels 108 is stacked above blocks representing prior communication devices 104 assigned the orthogonal channel 108 in a tower configuration as described herein. For example, at 450, a first communication device 402 is allocated a particular number of orthogonal channels 108. In this example, since the first communication device 402 is the first device in the tower, the first communication device 402 is assigned corresponding orthogonal channels 108 during a first iteration of the tower building instructions 132. Thus, the orthogonal channels 108 allocated to the first communication device 402 begin at an initial channel (e.g., Cstart=0) and the number of orthogonal channels 108 allocated is equal to an S max value which is equal to the resource requirement value 146 of the first communication device 402.

An example of the result of a second iteration of the tower building instructions 132 is illustrated at 452 of FIG. 4A. During the second iteration, a second communication device 404 is allocated a number of orthogonal channels 108. Since the second communication device 404 is allocated some of the same orthogonal channels 108 as the first communication device 402, reuse of the orthogonal channels 108 is illustrated in 452 by stacking the block representing the second communication device 404 on top of the block representing the first communication device 402. In a particular example illustrated, the second communication device 404 is allocated the same number of orthogonal channels 108 as are allocated to the first communication device 402. The block corresponding to the second communication device 404 has the same dimensions and same position horizontally as the first communication device 402 indicating that the same initial orthogonal channel 108 is allocated to each of the first communication device 402 and the second communication device 404, and that the number of orthogonal channels 108 allocated to each of the first communication device 402 and the second communication device 404 is the same.

During a subsequent iteration of the tower building instructions 132, no other communication device 104 having a resource requirement value 146 that is equal to the number of orthogonal channels 108 allocated to the first communication device 402 and to the second communication device 404 and that does not conflict with the first communication device 402 and the second communication device 404 is identified. Rather, the tower building instructions 132 identify a third communication device 406 that has a smaller resource requirement value 146 than the resource requirement value 146 of the first communication device 402 and the second communication device 404. The conflict lists 136 indicate that the third communication device 406 does not conflict with either of the first communication device 402 or the second communication device 404. The device list 144 is updated based on the conflict lists 136 after allocation of the orthogonal channels 108 to the first communication device 402 and after allocation of the orthogonal channels 108 to the second communication device 404. So during the third iteration of the tower building instructions 132 illustrated in FIG. 4A, the communication devices 104 that conflict with the first communication device 402 and the second communication device 404 are not among a set of communication devices 104 considered when determining whether any communication device 104 of the device list 144 has a resource requirement value 146 equal to S max at block 206.

At 454, a block representing the third communication device 406 is illustrated as stacked on top of the block representing the first communication device 402 and the block representing the second communication device 404. The block representing the third communication device 406 is aligned on the left with the blocks representing the first communication device 402 and the second communication device 404 indicating that the number of orthogonal channels 108 allocated to the third communication device 406 begin from the same initial orthogonal channel 108 (e.g., Cstart) as the orthogonal channels 108 allocated to the first communication device 402 and the orthogonal channels 108 allocated to the second communication device 404. Since the number of orthogonal channels 108 allocated to the third communication device 406 is less than the number of orthogonal channels 108 allocated to the first communication device 402 and to the second communication device 404, the width of the block representing the third communication device 406 is narrower than the width of the blocks representing the first communication device 402 and the second communication device 404. Stacking the block representing the third communication device 406 on top of the block representing the second communication device 404 leaves a gap on the right-hand side of the tower illustrated at 454. Further, since the orthogonal channels 108 allocated to the third communication device 406 start from the same initial orthogonal channel 108 (e.g., Cstart) and include fewer than the total number of orthogonal channels 108 allocated to the first communication device 402 and the second communication device 404, the orthogonal channels 108 allocated to the third communication device 406 are a subset of the orthogonal channels 108 allocated to the first communication device 402 and the second communication device 404.

In the example illustrated in FIG. 4A, during a subsequent iteration of the tower building instructions 132, a fourth communication device 408 is identified that does not conflict with the first communication device 402, the second communication device 404, and the third communication device 406, and a set of orthogonal channels 108 is allocated to the fourth communication device 408, illustrated at 456. The block representing the fourth communication device 408 is aligned on the left with the blocks representing the first communication device 402, the second communication device 404, and the third communication device 406. The alignment of the block representing the fourth communication device 408 indicates that the set of orthogonal channels 108 allocated to the fourth communication device 408 is a subset of the set of orthogonal channels 108 allocated to the first communication device 402, the second communication device 404, and the third communication device 406.

Further, the tower illustrated at 456 of FIG. 4A illustrates four reuses of at least a subset of the orthogonal channels 108 allocated to the first communication device 402. For example, the orthogonal channels 108 allocated to the fourth communication device 408 are also allocated to the third communication device 406, to the second communication device 404, and to the first communication device 402 and thus, a subset of orthogonal channels 108 allocated to the first communication device 402 are reused four times at 456. In a particular example illustrated, the number of reuses 222 is initialized to four and thus the iteration condition associated with the tower building instructions 132 is satisfied at 456 because the number of reuses 222 is decremented during each iteration as in the flowchart of FIG. 2 and is equal to a number of reuses threshold (e.g., 0) allocating the orthogonal channels 108 to the fourth communication device 408. It should be understood that initializing the number of reuses 222 to four and decrementing the number of reuses 222 during each iteration is provided as an illustrative non-limiting example. The tower building instructions 132 may track the number of reuses 222 in other ways. For example, in some implementations, the number of reuses 222 may be initialized to another initial value (e.g., 0) and incremented during each iteration to reach another threshold (e.g., 4) allocating the orthogonal channels 108 to the fourth communication device 408.

As a result of allocating orthogonal channels 108 starting with the same initial orthogonal channel 108 (e.g., Cstart=0) and allocating fewer orthogonal channels 108 to each of the third communication device 406 and the fourth communication device 408 than to the first communication device 402 and second communication device 404, several gaps are formed. The gaps correspond to the orthogonal channels 108 that could be reused based upon the number of reuses (e.g., 4) allowed but that were not allocated during the iterations of the tower building instructions 132 prior to the number of reuses threshold being satisfied.

Operation of the gap filling instructions 134 is described with reference to the flowchart of FIG. 3 and with reference to FIGS. 4A and 4B to illustrate operation of the gap filling instructions 134 in context of the overall system 100 including the gap filling instructions 134 and tower building instructions 132. The gap filling instructions 134 are called by the tower building instructions 132 via the off-page reference 226 when an iteration condition associated with the tower building instructions 132 is satisfied. The gap filling instructions 134 in the example of FIG. 3 start, at block 302, by setting an iteration counter 304 based on a number of gaps identified in a tower built by the tower building instructions 132. For example, referring briefly to FIG. 4A, the gap filling instructions 134 can be called after the tower building instructions 132 in order to finish the tower illustrated at 456. In this example, the gap filling instructions 134 identify two gaps corresponding to a number of times the number of orthogonal channels 108 allocated to a particular communication device 104 change. That is, in FIG. 4A, at 456, the first communication device 402 and the second communication device 404 are allocated the same number of orthogonal channels 108, and therefore leave no gaps. However, the third communication device 406 is allocated a different number of orthogonal channels 108 than the second communication device 404 indicating that a gap 480 is generated by allocation of the channels to the third communication device 406. Likewise, the number of orthogonal channels 108 allocated to the fourth communication device 408 is less than the number of orthogonal channels 108 allocated to the third communication device 406 indicating a gap 482 corresponding to the difference between the number of orthogonal channels 108 allocated to the fourth communication device 408 and allocated to the third communication device 406. Thus, the tower at 456 represents two gaps, e.g., the gap 480 and the gap 482.

Returning to FIG. 3, after identifying the number of gaps (e.g., 2) and setting the iteration counter 304 (e.g., equal to the number of gaps), the gap filling instructions 134 proceed to block 306 to determine whether the iteration counter 304 is equal to 0. If the iteration counter 304 is equal to 0, the gap filling instructions 134 set conditions for beginning a new tower and call the tower building instructions 132. For example, at block 308, the gap filling instructions 134 reset the conflict inheritance data 142, reset the S max value 320, and reset the number of reuses 222. Additionally, the gap filling instructions 134 can advance to a next starting channel by changing the value of the Cstart, at block 310. After resetting the conflict inheritance data 142, the S max value 320, the number of reuses 222, and advancing to a next Start channel by updating the Cstart, the gap filling instructions 134 can call or return to the tower building instructions 132 via an off-page reference 204.

In a particular implementation, the gap filling instructions 134, prior to calling the tower building instructions 132, update the device list 144 to indicate the communication devices 104 that are available for allocation of the orthogonal channels 108. For example, the gap filling instructions 134 add one or more communication devices 104 to the device list 144 that was previously removed from the device list 144 for conflicting with another communication device 104 that had been allocated an orthogonal channel 108. The communication devices 104 added back to the device list 144 are available for allocation of one or more second orthogonal channels 108 starting from the next Start channel because the second orthogonal channels 108 are distinct from previously allocated orthogonal channels 108. In a particular implementation, the gap filling instructions 134, in response to determining that the assignment data 118 of FIG. 1 indicates that a particular communication device 104 has not been allocated an orthogonal channel 108, adds the particular communication device 104 to the device list 144.

When the iteration counter 304 is not equal to 0, at block 306, the gap filling instructions 134 proceed to block 312 and select a next gap, e.g., gap i, where i is a positive integer value index of the gaps identified. For example, a first gap (e.g., the gap 480) identified corresponds to a lowest gap of the tower in the example illustrated in FIG. 4A. After selecting the next gap at block 312, the gap filling instructions 134 determine a size of the gap at block 314. Referring to FIG. 4A, at 456, the size of the gap 480 can be determined by subtracting the number of orthogonal channels 108 allocated to the third communication device 406 from the number of orthogonal channels 108 allocated to the second communication device 404. In a particular example, the size of the gap 480 can be determined by subtracting the S max (e.g., S max (i)) used to assign the orthogonal channels 108 to the third communication device 406 from the S max (e.g., S max (i−1)) used to assign the orthogonal channels 108 to the communication device lower on the tower than the third communication device 406, e.g., the second communication device 404.

After determining the size of the gap at block 314, the gap filling instructions 134 proceed to decision block 316 to determine whether the size of the gap is greater than 0. If the size of the gap is not greater than 0, at decision block 316, the gap filling instructions 134 proceed to block 308 to reset conditions to begin a next tower. If the gap size is greater than 0, the gap filling instructions 134 proceed to block 318 to set an S max value 320 equal to the gap size, to block 322 to set a start channel (Cstart) 324 to a first channel of the gap, to block 326 to determine the number of reuses 222, and to block 328 to filter the device list 144 based on the conflict inheritance data 142.

Returning to 456 of FIG. 4A, a gap size of the gap 480 and the S max value 320 associated with the gap 480 is equal to a number of orthogonal channels 108 allocated to the second communication device 404 minus a number of orthogonal channels 108 allocated to the third communication device 406. Additionally, the number of reuses 222 associated with the gap 480 is equal to a number of communication devices 104 below the gap 480 in the tower at 456, e.g., the number of reuses 222 is equal to 2 corresponding to reuses based on the first communication device 402 and the second communication device 404. Further, the Cstart 324 associated with the gap 480 is equal to the last orthogonal channel 108 allocated to the third communication device 406 plus 1. The device list 144 used to identify a communication device 104 to allocate the orthogonal channels 108 to replace the gap 480 is filtered such that no communication device 104 in the device list 144 conflicts with the first communication device 402 or the second communication device 404. After setting the S max value 320, the Cstart 324, the number of reuses 222, and the device list 144 associated with the gap 480, the gap filling instructions 134 proceed to the off-page reference 204 to call the tower building instructions 132.

The tower building instructions 132 beginning at the off-page reference 204 receive the S max value 320, the Cstart 324, the number of reuses 222, and the device list 144 from the gap filling instructions 134 and begin operation, as described previously, omitting the initialization step 202 in favor of the values assigned by the gap filling instructions 134. Thus, the tower building instructions 132 using the initial values provided by the gap filling instructions 134 proceed to identify communication devices 104 that have resource requirement values 146 equal to or less than the S max value 320 and do not conflict with the first communication device 402 and the second communication device 404 to allocate orthogonal channels 108 corresponding to the gap 480. As illustrated at 458 of FIG. 4A, the tower building instructions 132 allocate a set of orthogonal channels 108 corresponding to the gap 480 to a fifth communication device 410. After assigning the set of orthogonal channels 108 corresponding to the gap 480 to the fifth communication device 410, the tower building instructions 132 continue to iterate as previously described to assign a set of orthogonal channels 108 corresponding to the gap 480 to a sixth communication device 412, at 460 of FIG. 4A. The allocation of the set of orthogonal channels 108 corresponding to the gap 480 to the sixth communication device 412 causes the number of reuses 222 associated with the set of orthogonal channels 108 to be satisfied and thus ceases iteration of the tower building instructions 132 and returns to the gap filling instructions 134.

The gap filling instructions 134 identify that one gap (e.g., the gap 482) remains and thus set the iteration counter 304 to a value of 1, set the S max value 320 to a size of the gap 482, set the Cstart 324 to a starting channel of the gap 482, set the number of reuses 222 to a number of reuses available, and update the device list 144 before calling the tower building instructions 132 to fill the gap 482. As illustrated in FIG. 4B, at 462, the gap filling instructions 134 identify a seventh communication device 414 to allocate the set of orthogonal channels 108 corresponding to the gap 482.

After assigning the seventh communication device 414 to fill the gap 482, the gap filling instructions 134 determine that the iteration counter 304 is equal to 0 and therefore proceed to set conditions to begin a new tower 490. The tower 490 is initialized based on reset values of the conflict inheritance data 142, the S max value 320, the number of reuses 222, and the Cstart 323 as provided by the gap filling instructions 134 to the tower building instructions 132. Thus, in FIG. 4B, the tower 490 corresponds to an additional set of communication devices 416-428 assigned orthogonal channels 108 as represented at 464. Gap filling and tower building continue until the number of orthogonal channels 108 allocated equals the total number of orthogonal channels 108 available or until no more communication devices 104 are identified to which orthogonal channels 108 have not been allocated.

The tower building instructions 132 and the gap filling instructions 134 thus work together to allocate the orthogonal channels 108 so that the same orthogonal channel 108 is reused for non-conflicting communication devices 104 while not allocating the same orthogonal channel 108 to conflicting communication devices 104. The tower building instructions 132 and the gap filling instructions 134 also enable a number of reuses limitation to be satisfied so that a particular orthogonal channel 108 is not overused.

FIGS. 5 and 6 illustrate results of operation of the tower building instructions 132 and the gap filling instructions 134 in cooperation with the independent set analysis instructions 128 and the conflict detection instructions 126. In FIG. 5, a graph illustrates enforcement of an interference metric value 148 by the conflict detection instructions 126. For example, the conflict detection instructions 126 generates the conflict lists 136 based on the interference metric value 148. The independent set analysis instructions 128 allocate the orthogonal channels 108 based on the conflict lists 136. In this example, the interference metric value 148 represents a threshold distance between the communication devices 104, e.g., users of a communication system, such as the system 100 of FIG. 1. To illustrate, a distance between a pair of communication devices 104 has to be greater than the threshold distance indicated by the interference metric value 148 in order for the same orthogonal channel 108 to be allocated to each of the pair of communication devices 104.

In the example illustrated in FIG. 5, the X-axis corresponds to a number of orthogonal channels 108 of the system 100, where a particular channel number corresponds to a specific subband or orthogonal channel 108 of the system 100. A distance illustrated on the Y-axis of the graph corresponds to an interference metric value 148 indicating pairwise interference between the communication devices 104. In the example illustrated in FIG. 5, a threshold distance between a pair of communication devices 104 is established as the interference metric 148. The interference metric value 148 has been enforced as indicated by the solid black line showing that no pair of communication devices 104 having a distance that is less than a minimum distance criterion is allocated the same orthogonal channel 108. That is to say no pair of communication devices 104 allocated the same orthogonal channel 108 has more interference than allowed by the interference threshold. The minimum distance criteria is enforced by using the conflict lists 136 and the conflict inheritance data 142 to filter the device list 144 to identify the communication devices 104 that are available for allocation of the orthogonal channels 108 by the tower building instructions 132. Thus, FIG. 5 illustrates that by using the tower building instructions 132 and the independent set analysis instructions 128, any arbitrary minimum distance criteria can be enforced to ensure that interference among the communication devices 104 in the system 100 is limited to acceptable levels.

FIG. 6 illustrates an example of how communication sub-bands or orthogonal channels 108 of the system 100 are allocated among a set of communication devices 104. In particular, FIG. 6 illustrates that the number of reuses satisfies a reuse limitation, e.g., 16 reuses in the example of FIG. 6. FIG. 6 also illustrates that reuse of the orthogonal channels 108 is relatively uniformly distributed among the allocated orthogonal channels 108 which improves overall operation of the communications.

FIG. 7 is a flowchart illustrating a particular example of a method of reusing spectrum resources of a communication system among multiple communication devices. For example, the method 700 may be performed by the independent set analysis instructions 128, the tower building instructions 132, the gap filling instructions 134, the conflict detection instructions, 126, the channel assignment instructions 130, the communication controller 112, the processors 110, the communication node 102 of FIG. 1, or a combination thereof, in order to allocate the spectrum resources 106 to the communication devices 104.

In a particular example, the spectrum resources 106 are allocated as sets of orthogonal channels 108 used by the communication devices 104 and the communication node 102 in order to facilitate communication between the communication devices 104 or between a communication device 104 and the communication node 102.

The method 700 includes obtaining a plurality of conflict lists including a conflict list for each communication device of the set of communication devices, at 702. For example, the communication node 102 of FIG. 1 can execute the conflict detection instructions 126 to generate the conflict lists 136. As described above, the conflict lists 136 can include an adjacency matrix or other data structure that identifies which communication devices 104 have an interference metric value 148 that is greater than an interference metric threshold of the thresholds 138. The conflict list for each communication device 104 identifies conflicting communication devices of the set of communication devices 104. Each conflicting communication device has an interference metric value 148 that is greater than or satisfies the interference metric threshold. For example, where the interference metric value 148 is distance, the interference metric threshold may indicate a minimum distance and the interference metric value 148 can satisfy the interference metric threshold by being less than the minimum distance. Alternatively, the interference metric value 148 can be a signal-to-noise ratio, in which case the interference metric value 148 can satisfy the interference metric threshold by being greater than a threshold signal-to-noise ratio.

In some implementations, rather than executing the conflict detection instructions 126 to obtain the conflict lists 136, the communication node 102 can receive the conflict lists 136 from another device such as a ground-based control system. Alternatively, each communication device 104 can provide a conflict list 136 to the communication node 102 based on measurements performed at the respective communication device 104.

The method 700 also includes obtaining, at 704, resource requirement values including a resource requirement value for each communication device of the communication devices. For example, the communication node 102 of FIG. 1 obtains the resource requirement values 146. The resource requirement value 146 for each communication device 104 indicates a number of orthogonal channels 108 that are required to satisfy demand associated with the respective communication device 104. For example, the first communication device 104A of FIG. 1 may have a particular demand corresponding to an amount of bandwidth that the first communication device 104A needs in order to transmit or receive data or an amount of bandwidth required by devices served by the first communication device 104A in order to transmit or receive data. The amount of bandwidth required by the first communication device 104A corresponds to a number of orthogonal channels 108 and is further related to a resource communication efficiency associated with communications between the communication node 102 and the first communication device 104A. A resource requirement value 146 associated with the first communication device 104A indicates the number of orthogonal channels 108 that are required to satisfy the amount of bandwidth required by the first communication device 104A.

In a particular implementation, the communication node 102 obtains the resource requirement values 146 from the communication devices 104. For example, each communication device 104 transmits data indicating the resource requirement value 146 of the communication device 104 to the communication node 102 based on demand (e.g., a bandwidth requirement) of the communication device 104.

The method 700 also includes, at 706, determining that two or more communication devices are associated with a particular resource requirement value. For example, at block 210 of FIG. 2, the tower building instructions 132 determine that more than one communication device 104 is associated with a resource requirement value 146 that is equal to the current S max value.

The method 700 also includes, at 708, selecting a particular communication device from among the two or more communication devices by using the conflict lists to perform a maximum independent set analysis based on the two or more communication devices. For example, returning to FIG. 2, when the tower building instructions 132 determine that two or more communication devices 104 are associated with the resource requirement value 146 equal to the current S max value, the tower building instructions 132 select a particular communication device 104 among the two or more communication devices 104 using the independent set analysis instructions 128 and the conflict lists 136 to perform a maximum independent set analysis. In particular, one of the two or more communication devices 104 is selected, where the selected communication device 104 is indicated by the conflict lists 136 as a least conflicted communication device of the two or more communication devices 104.

In a particular aspect, the tower building instructions 132, after calling the independent set analysis instructions 128, generate the conflict inheritance data 142 identifying conflicting communication devices 104 associated with the selected communication device 104. The tower building instructions 132 modify the device list 144 to remove the conflicting communication devices 104 from the consideration during at least one subsequent iteration.

The method 700 also includes, at 710, assigning a set of orthogonal channels to the particular communication device that is selected based on the maximum independent set analysis. The set of orthogonal channels assigned to the particular communication device includes a number of orthogonal channels that is based on the particular resource requirement value of the selected communication device. For example, returning to FIG. 2, the tower building instructions 132 select a particular communication device 104 using the independent set analysis instructions 128, at block 212. The tower building instructions 132 assign a number of orthogonal channels 108 equal to the S max value to the selected communication device 104 by generating the assignment data 118. In this example, the S max value is equal to the resource requirement value 146 of the selected communication device 104 as indicated by the decision blocks 206 and 210.

The method 700 also includes, at 712, configuring the communication system to communicate with the particular communication device based on the set of orthogonal channels assigned. For example, the communication node 102 of FIG. 1 stores the assignment data 118 generated at block 214 of FIG. 2 as part of the configuration settings 116. The configuration settings 116 are used by the communication controller 112, the switch matrix 114, the beamformer 120, or a combination thereof, to communicate with a particular communication device 104 via an assigned set of orthogonal channels 108.

In a particular aspect, the tower building instructions 132, after assigning the set of orthogonal channels 108 to the selected communication device 104, identify at least one second communication device 104 that does not conflict with the selected communication device 104 and that has a resource requirement value 146 that is less than the resource requirement value of the selected communication device 104. For example, as illustrated in FIGS. 4A-4B, the tower building instructions 132, after assigning a first set of orthogonal channels 108 to the second communication device 404, determine that the communication devices 406-414 do not conflict with any communication device (e.g., the communication devices 402-404) assigned to the first set of orthogonal channels 108 and that each of the communication devices 406-414 has a resource requirement value 146 that is less than the resource requirement value 146 of the second communication device 404.

The tower building instructions 132 determine a largest resource requirement value among the resource requirement values 146 of the communication devices 406-414 that have not been allocated an orthogonal channel 108. The tower building instructions 132 identify the third communication device 406 in response to determining that the resource requirement value 146 of the third communication device 406 is equal to the largest resource requirement value. In a particular example, the tower building instructions 132 determine that multiple communication devices that have not been allocated an orthogonal channel 108 have resource requirement values 146 that are equal to the largest resource requirement value. In this example, the tower building instructions 132 identify the third communication device 406 by performing the maximum independent set analysis on the multiple communication devices.

The tower building instructions 132 assign a first subset of the first set of orthogonal channels 108 to the third communication device 406. The first subset includes a number of orthogonal channels 108 that is equal to the resource requirement value 146 of the third communication device 406. The communication node 102 configures the communication system 100 to communicate with the third communication device 406 based on the first subset. For example, the tower building instructions 132 update the assignment data 118 to indicate that the first subset is assigned to the third communication device 406.

The tower building instructions 132, after assigning the first subset to the third communication device 406, determine a difference between the resource requirement value 146 of the second communication device 404 and the resource requirement value 146 of the third communication device 406. The tower building instructions 132 select the fifth communication device 410 based on the resource requirement values 146, the difference between the resource requirement value 146 of the second communication device 404 and the resource requirement value 146 of the third communication device 406, and based on the conflict inheritance data 142 associated with the second communication device 404, as described with reference to FIGS. 2-4A. The tower building instructions 132 assign a second subset of the first set of orthogonal channels 108 to the fifth communication device 410. The second subset is contiguous to the first subset.

In a particular implementation, the spectrum resources 106 of FIG. 1 are divided into an integer number of logical channels. The first set of orthogonal channels 108 corresponds to a contiguous subset of the logical channels. The first subset of the first set of orthogonal channels 108 corresponds to a contiguous subset of the first set of orthogonal channels 108. The second subset of the first set of orthogonal channels 108 corresponds to a second contiguous subset of the first set of orthogonal channels 108. The second subset of the first set of orthogonal channels 108 is contiguous with the first subset of the first set of orthogonal channels 108.

In a particular example, the tower building instructions 132, before assigning the set of orthogonal channels 108 to the second communication device 404, assign at least the set of orthogonal channels 108 to the first communication device 402. The first communication device 402 is associated with a resource requirement value 146 that is greater than or equal to a resource requirement value 146 associated with the second communication device 404. The tower building instructions 132 identify, based on the conflict lists 136, a subset of the communication devices 104 that do not conflict with the first communication device 402. The tower building instructions 132 identify two or more communication devices 104 associated with a particular resource requirement value 146 from among the subset of the communication devices 104. For example, the tower building instructions 132 identify the two or more communication devices 104 based on the particular resource requirement value 146 being a largest resource requirement value 146 among the resource requirement values 146 for the subset of the communication devices 104.

In a particular example, the tower building instructions 132, after selecting the particular communication device 104, iteratively repeat selecting communication devices 104 and assigning to the selected communication devices 104 the set of orthogonal channels 108 or a subset of the set of orthogonal channels 108 until an iteration condition is satisfied, as described with reference to FIG. 2. In a particular aspect, an iteration condition is satisfied when a number of communication devices 104 assigned any subset of the set of orthogonal channels 108 is equal to a reuse threshold. For example, the tower building instructions 132 determine that an iteration condition is satisfied in response to determining that number of reuses 222 satisfies a reuse threshold, as described with reference to FIG. 2.

In a particular implementation, the tower building instructions 132, after the iteration condition is satisfied, assign a second set of orthogonal channels 108 to one or more communication devices 104 of a previously unassigned set of the communication devices 104. In a first example, the second set of orthogonal channels 108 is a subset of the previously allocated set of orthogonal channels 108. To illustrate, the gap filling instructions 134 generate (or update) the Cstart 324 to indicate a first orthogonal channel 108 of a gap (e.g., the gap 480 of FIG. 4A), at block 322 of FIG. 3, update the device list 144 based on the conflict inheritance data 142, at block 328, and call the tower building instructions 132 via the off-page reference 204, as described with reference to FIG. 3. The device list 144 indicates a previously unassigned set of communication devices 104 (e.g., the communication devices 410-414 of FIG. 4A and the communication devices 416-428 of FIG. 4B) that do not conflict with communication devices 104

(e.g., the first communication device 402 and the second communication device 404 of FIG. 4A) that have previously been assigned the second set of orthogonal channels 108 or assigned any subset of the second set of orthogonal channels 108.

The tower building instructions 132 assign the second set of orthogonal channels 108 to the one or more communication device 104 (e.g., the communication devices 410-412 of FIG. 4A) indicated by the device list 144, as described with reference to FIGS. 2-4A. For example, the tower building instructions 132 assign the second set of orthogonal channels 108 to the fifth communication device 410 based on the resource requirement values 146 of the communication devices 104 indicated by the device list 144 and based on the conflict lists 136, as described with reference to FIGS. 2 and 4A.

In a second example, the second set of orthogonal channels 108 is contiguous to the previously allocated set of orthogonal channels 108. In this example, the gap filling instructions 134 reset the conflict inheritance data 142, at block 308 of FIG. 3, advance to a next starting channel, at block 310, and call the tower building instructions 132 via the off-page reference 204, as described with reference to FIG. 3. The device list 144 indicates a previously unassigned set of communication devices 104 (e.g., the communication devices 416-428 of FIG. 4B). The device list 144 indicates a particular communication device 104 independently of whether the particular communication device 104 conflicts with one or more communication devices 104 that are assigned the previously allocated set of orthogonal channels 108. The tower building instructions 132 assign the second set of orthogonal channels 108 to the one or more communication device 104 (e.g., the communication devices 416-428 of FIG. 4B) indicated by the device list 144, as described with reference to FIGS. 2-4B.

The channel assignment instructions 130 change the configuration settings 116 by updating or storing the assignment data 118. The channel assignment instructions 130 thus configure the communication system 100 to communicate with the previously unassigned communication devices 104 (e.g., the communication devices 410-412 of FIG. 4A or the communication devices 416-428 of FIG. 4B) using the second set of orthogonal channels 108.

The method 700 thus enables assignment of the orthogonal channels 108 so that particular interference metric requirements are satisfied among the communication devices 104, such as pairwise interference metrics, and can satisfy reuse conditions by reusing particular orthogonal channels 108 no more than a specified threshold number of reuses which improves operation of the communication system 100 as a whole.

Figure 8:
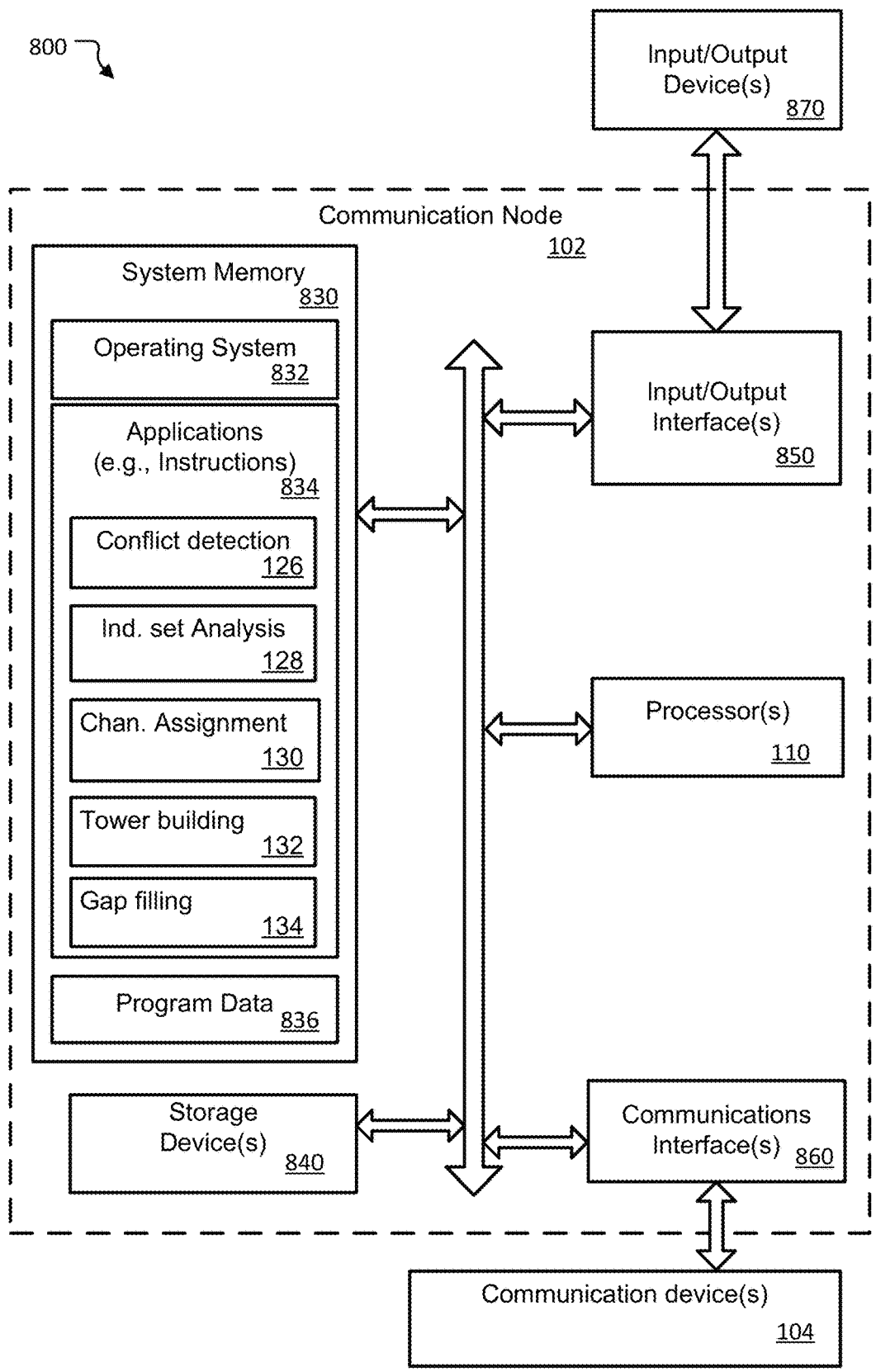
FIG. 8 is a block diagram of a computing environment including a computing device configured to support aspects of computer-implemented methods and computer-executable program instructions (or code) according to the present disclosure.

FIG. 8 is a block diagram of a computing environment 800 including the communication node 102. In a particular implementation, the communication node 102 includes a computing device configured to support aspects of computer-implemented methods and computer-executable program instructions (or code) according to the present disclosure. For example, the communication node 102, or portions thereof, is configured to execute instructions to initiate, perform, or control one or more operations described with reference to FIGS. 1-7.

The communication node 102 includes the processors 110. The processor(s) 110 are configured to communicate with system memory 830, one or more storage devices 840, one or more input/output interfaces 850, one or more communication interfaces 860, or any combination thereof. The system memory 830 includes volatile memory devices (e.g., random access memory (RAM) devices), nonvolatile memory devices (e.g., read-only memory (ROM) devices, programmable read-only memory, and flash memory), or both. In a particular aspect, the system memory 830 includes at least a portion of the memory 122 of FIG. 1. The system memory 830 stores an operating system 832, which may include a basic input/output system for booting the communication node 102 as well as a full operating system to enable the communication node 102 to interact with users, other programs, and other devices. The system memory 830 stores system (program) data 836, such as the conflict lists 136, the thresholds 138, the iteration conditions 140, the conflict inheritance data 142, the device list 144, the resource requirement values 146, the interference metric values 148, other data, or a combination thereof.

The system memory 830 includes one or more applications 834 (e.g., sets of instructions) executable by the processor(s) 110. As an example, the one or more applications 834 include instructions executable by the processor(s) 110 to initiate, control, or perform one or more operations described with reference to FIGS. 1-7. To illustrate, the one or more applications 834 include instructions executable by the processor(s) 110 to initiate, control, or perform one or more operations described with reference to the communication controller 112, the switch matrix 114, the beamformer 120, or a combination thereof. For example, the applications 834 include the conflict detection instructions 126, the independent set analysis instructions 128, the channel assignment instructions 130, the tower building instructions 132, the gap filling instructions 134, other instructions, or a combination thereof.

The one or more storage devices 840 include nonvolatile storage devices, such as magnetic disks, optical disks, or flash memory devices. In a particular example, the storage devices 840 include both removable and non-removable memory devices. The storage devices 840 are configured to store an operating system, images of operating systems, applications (e.g., one or more of the applications 834), and program data (e.g., the program data 836). In a particular aspect, the system memory 830, the storage devices 840, or both, include tangible computer-readable media. In a particular aspect, one or more of the storage devices 840 are external to the communication node 102.

The one or more input/output interfaces 850 enable the communication node 102 to communicate with one or more input/output devices 870 to facilitate user interaction. For example, the one or more input/output interfaces 850 can include a display interface, an input interface, or both. The processor(s) 110 are configured to communicate with the communication devices 104 via the one or more communication interfaces 860. For example, the one or more communication interfaces 860 can include a network interface, the receivers 150, the transmitters 152, the antennas 154, or a combination thereof.

In conjunction with the described systems and methods, an apparatus is disclosed that includes means for enabling spectrum resource reuse among a plurality of communications devices. For example, the means for enabling spectrum reuse include the communication interfaces 860.

The apparatus also includes means for obtaining a plurality of conflict lists including a conflict list for each communication device of the communication devices. For example, the means for obtaining the plurality of conflict lists 136 includes the communication controller 112, the processors 110, the communication node 102, or a combination thereof, as described with reference to FIG. 1. The conflict list 136 for each communication device 104 identifies conflicting communication devices 104 of the communication devices 104. Each conflicting communication device 104 is associated with an interference metric value 148 that satisfies a threshold 138 (e.g., an interference metric threshold).

The apparatus further includes means for obtaining resource requirement values, including a resource requirement value for each communication device of the communication devices. For example, the means for obtaining the resource requirement values 146 includes the communication controller 112, the processors 110, the communication node 102, or a combination thereof, as described with reference to FIG. 1. The resource requirement value 146 for each communication device 104 indicating a number of orthogonal channels 108 that are required to satisfy demand associated with the communication device 104.

The apparatus also includes means for determining that two or more communication devices are associated with a particular resource requirement value. For example, the means for determining that two or more communication devices 104 are associated with a particular resource requirement value 146 includes the communication controller 112, the processors 110, the communication node 102, or a combination thereof, as described with reference to FIG. 1.

The apparatus further includes means for selecting a particular communication device from among the two or more communication devices by using the conflict lists to perform a maximum independent set analysis based on the two or more communication devices. For example, the means for selecting a particular communication device 104 from among the two or more communication devices 104 includes the communication controller 112, the processors 110, the communication node 102, or a combination thereof, as described with reference to FIG. 1.

The apparatus also includes means for assigning a set of orthogonal channels to the particular communication device. For example, the means for assigning a set of the orthogonal channels 108 includes the communication controller 112, the processors 110, the communication node 102, or a combination thereof, as described with reference to FIG. 1. The set of orthogonal channels 108 includes a number of orthogonal channels 108 equal to the particular resource requirement value 146 associated with the selected communication device 104.

The apparatus further includes means for storing configuration settings to configure one or more transmitters, one or more receivers, or the combination thereof, to communicate with the particular communication device based on the set of orthogonal channels. For example, the means for storing configuration settings 116 includes the communication controller 112, the processors 110, the communication node 102, or a combination thereof, as described with reference to FIG. 1.

In some implementations, a non-transitory, computer readable medium stores instructions that, when executed by a processor, cause the processor to initiate, perform, or control operations to perform part or all of the functionality described above. For example, the instructions may be executable to implement the method of FIG. 7. In some implementations, part or all of the method of FIG. 7 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of reusing spectrum resources of a communication system among multiple communication devices, the method comprising:

obtaining a plurality of conflict lists including a conflict list for each communication device of the multiple communication devices, the conflict list for each communication device identifying conflicting communication devices of the multiple communication devices, wherein each conflicting communication device is associated with an interference metric value that satisfies a threshold;

obtaining resource requirement values, including a resource requirement value for each communication device of the multiple communication devices, the resource requirement value for each communication device indicating a number of orthogonal channels that are required to satisfy demand associated with the communication device;

determining that two or more communication devices of the multiple communication devices are associated with a particular resource requirement value;

selecting a first communication device from among the two or more communication devices by using the conflict lists to perform a maximum independent set analysis based on the two or more communication devices;

assigning a set of orthogonal channels to the first communication device, the set of orthogonal channels including a number of orthogonal channels that is based on the particular resource requirement value;

assigning a first subset of the set of orthogonal channels to a second communication device that does not conflict with the first communication device, the first subset based on a resource requirement value of the second communication device that is less than or equal to the particular resource requirement value;

assigning a second subset of the set of orthogonal channels to a third communication device of the multiple communication devices, wherein the third communication device has a resource requirement value that is less than or equal to the particular resource requirement value, and wherein the third communication device does not conflict with the first communication device based on conflict inheritance data associated with the first communication device; and configuring the communication system to communicate with the first communication device based on the set of orthogonal channels, to communicate with the second communication device based on the first subset of the set of orthogonal channels, and to communicate with the third communication device based on the second subset of the orthogonal channels.

2. The method of claim 1, further comprising, before assigning the set of orthogonal channels to the first communication device:

assigning at least the set of orthogonal channels to a particular communication device, the particular communication device associated with a first resource requirement value that is greater than or equal to the first resource requirement value;

identifying a third subset of the multiple communication devices that do not conflict with the first communication device based on the conflict lists; and identifying the two or more communication devices from among the third subset.

3. The method of claim 2, wherein the two or more communication devices are identified from among the third subset based on the particular resource requirement value being a largest resource requirement value among the third subset.

4. The method of claim 1, further comprising, after selecting the first communication device, iteratively repeating selecting communication devices and assigning to selected communication devices the set of orthogonal channels or a subset of the set of orthogonal channels until an iteration condition is satisfied.

5. The method of claim 4, wherein the iteration condition is satisfied when a number of communication devices assigned any subset of the set of orthogonal channels is equal to a reuse threshold.

6. The method of claim 4, further comprising, after the iteration condition is satisfied:

assigning a second set of orthogonal channels to one or more communication devices of a previously unassigned set of the multiple communication devices based on the resource requirement values associated with the previously unassigned set and based on the conflict lists; and configuring the communication system to communicate with the one or more communication devices of the previously unassigned set based on the second set of orthogonal channels.

7. The method of claim 6, wherein the second set of orthogonal channels is contiguous with the set of orthogonal channels.

8. The method of claim 1, wherein, performing the maximum independent set analysis comprises determining, based on the conflict lists, a least conflicted communication device of the two or more communication devices, wherein the least conflicted communication device is selected as the first communication device.

9. The method of claim 8, further comprising, after performing the maximum independent set analysis:

generating conflict inheritance data identifying conflicting communication devices associated with the first communication device; and modifying a device list to remove the conflicting communication devices from consideration during at least one subsequent iteration.

10. The method of claim 1, wherein the set of orthogonal channels includes time-division multiple access (TDMA) channels, frequency-division multiple access (FDMA) channels, or code-division multiple access (CDMA) channels.

11. The method of claim 1, wherein the multiple communication devices comprise one or more access points, one or more end user devices, or both.

12. The method of claim 1, wherein the conflict lists are obtained by a satellite system from a ground-based control system.

13. The method of claim 1, wherein the second subset of the set of orthogonal channels is contiguous with the first subset of the set of orthogonal channels.

14. The method of claim 1, wherein the spectrum resources are divided into an integer number of logical channels, wherein the set of orthogonal channels corresponds to a contiguous subset of the logical channels, wherein the first subset of the set of orthogonal channels corresponds to a contiguous subset of the set of orthogonal channels, wherein the second subset of the set of orthogonal channels corresponds to a second contiguous subset of the set of orthogonal channels, and wherein the second subset of the set of orthogonal channels is contiguous with the first subset of the set of orthogonal channels.

15. A communication node comprising:

one or more transmitters, one or more receivers, or a combination thereof, configured to enable spectrum resource reuse among multiple communication devices; and a communication controller coupled to the one or more transmitters, the one or more receivers, or the combination thereof, the communication controller configured to reuse spectrum resources by performing operations including:

obtaining a plurality of conflict lists including a conflict list for each communication device of the multiple communication devices, the conflict list for each communication device identifying conflicting communication devices of the multiple communication devices, wherein each conflicting communication device is associated with an interference metric value that satisfies a threshold;

obtaining resource requirement values, including a resource requirement value for each communication device of the multiple communication devices, the resource requirement value for each communication device indicating a number of orthogonal channels that are required to satisfy demand associated with the communication device;

determining that two or more communication devices of the multiple communication devices are associated with a particular resource requirement value;

selecting a first communication device from among the two or more communication devices by using the conflict lists to perform a maximum independent set analysis based on the two or more communication devices;

assigning a set of orthogonal channels to the first communication device, the set of orthogonal channels including a number of orthogonal channels that is based on the particular resource requirement value;

determining a largest resource requirement value among a set of the multiple communication devices that do not conflict with any communication device assigned the set of orthogonal channels or assigned a subset of the orthogonal channels, the largest resource requirement value equal to or less than the particular resource requirement value;

assigning a first subset of the set of orthogonal channels to a second communication device based on the largest resource requirement value, wherein the second communication device is identified by a maximum independent set analysis based on a particular subset of the multiple communication devices, and wherein each communication device of the particular subset is associated with the largest resource requirement value; and storing configuration settings to configure the one or more transmitters, the one or more receivers, or the combination thereof, to communicate with the first communication device based on the set of orthogonal channels and to communicate with the second communication device based on the first subset of the set of orthogonal channels.

16. The communication node of claim 15, wherein the communication controller and the one or more transmitters, the one or more receivers, or the combination thereof, are integrated in a spacecraft, an aircraft, a land craft, or a watercraft.

17. The communication node of claim 15, wherein the communication controller and the one or more transmitters, the one or more receivers, or the combination thereof, are integrated in a base station.

18. The communication node of claim 15, wherein the multiple communication devices include one or more end user devices, one or more access points, or both.

19. The communication node of claim 15, wherein the set of orthogonal channels includes time-division multiple access (TDMA) channels, frequency-division multiple access (FDMA) channels, or code-division multiple access (CDMA) channels.

20. A computer-readable storage device storing instructions that are executable by a processor of a communication node to cause the processor to perform spectrum resource reuse operations comprising:

obtaining a plurality of conflict lists including a conflict list for each communication device of multiple communication devices that receive service from the communication node, the conflict list for each communication device identifying conflicting communication devices of the multiple communication devices, wherein each conflicting communication device is associated with an interference metric value that satisfies a threshold;

obtaining resource requirement values, including a resource requirement value for each communication device of the multiple communication devices, the resource requirement value for each communication device indicating a number of orthogonal channels that are required to satisfy demand associated with the communication device;

determining that two or more communication devices of the multiple communication devices are associated with a particular resource requirement value;

selecting a first communication device from among the two or more communication devices by using the conflict lists to perform a maximum independent set analysis based on the two or more communication devices;

assigning a set of orthogonal channels to the first communication device, the set of orthogonal channels including a number of orthogonal channels based on the particular resource requirement value;

determining a largest resource requirement value among a set of the multiple communication devices that do not conflict with any communication device assigned the set of orthogonal channels or assigned a subset of the orthogonal channels, the largest resource requirement value equal to or less than the articular resource requirement value;

assigning a first subset of the set of orthogonal channels to a second communication device based on the largest resource requirement value, wherein the second communication device is identified by a maximum independent set analysis based on a particular subset of the multiple communication devices, and wherein each communication device of the particular subset is associated with the largest resource requirement value; and configuring the communication node to communicate with the first communication device based on the set of orthogonal channels and to communicate with the second communication device based on the first subset of the set of orthogonal channels.

* * * * *